United States Patent
Mader et al.

(10) Patent No.: US 12,472,753 B2
(45) Date of Patent: Nov. 18, 2025

(54) IN-TRACK STITCHING ERROR CORRECTION

(71) Applicant: Eastman Kodak Company, Rochester, NY (US)

(72) Inventors: Rodney G. Mader, Springfield, OH (US); John E. Ludwicki, The Villages, FL (US)

(73) Assignee: Eastman Kodak Company, Rochester, NY (US)

( * ) Notice: Subject to any disclaimer, the term of this patent is extended or adjusted under 35 U.S.C. 154(b) by 153 days.

(21) Appl. No.: 18/390,150

(22) Filed: Dec. 20, 2023

(65) Prior Publication Data
US 2025/0206034 A1   Jun. 26, 2025

(51) Int. Cl.
*B41J 2/21* (2006.01)
*G06K 15/02* (2006.01)

(52) U.S. Cl.
CPC ........... *B41J 2/2135* (2013.01); *B41J 2/2146* (2013.01); *G06K 15/027* (2013.01); *G06K 2215/101* (2013.01)

(58) Field of Classification Search
CPC .... B41J 2/04508; B41J 2/04586; B41J 2/145; B41J 25/006; B41J 2/2135; B41J 2/2146; G06K 15/027; G06K 2215/101
See application file for complete search history.

(56) References Cited

U.S. PATENT DOCUMENTS

| | | | |
|---|---|---|---|
| 6,068,362 A | 5/2000 | Dunand et al. | |
| 7,118,188 B2 | 10/2006 | Vilanova et al. | |
| 7,871,145 B1 | 1/2011 | Enge | |
| 8,104,861 B2 | 1/2012 | Saettel et al. | |
| 8,123,326 B2 | 2/2012 | Saettel et al. | |
| 8,393,709 B2 | 3/2013 | Enge | |
| 8,760,712 B2 | 6/2014 | Enge et al. | |
| 8,842,330 B1 | 9/2014 | Enge | |
| 8,842,331 B1 | 9/2014 | Enge | |
| 8,845,059 B2 | 9/2014 | Enge et al. | |
| 8,857,938 B2 | 10/2014 | Enge et al. | |
| 2014/0002536 A1 | 1/2014 | Chen et al. | |
| 2014/0035991 A1 | 2/2014 | Chen et al. | |
| 2015/0174934 A1 * | 6/2015 | Bogart | H04N 1/00 347/19 |
| 2018/0126749 A1 | 5/2018 | Lau | |

FOREIGN PATENT DOCUMENTS

EP       729846 B1     1/2000

\* cited by examiner

*Primary Examiner* — Thinh H Nguyen
(74) *Attorney, Agent, or Firm* — David A. Novais

(57) ABSTRACT

Cross-track stitch errors in an inkjet printer are reduced by printing test patterns for a plurality of in-track offsets. A first test pattern portion to be printed with a first jetting modules includes a uniform density region having a slot with a slot width. A second test pattern portion to be printed with a second jetting modules includes a bar having a bar width, wherein the uniform density region of the first test pattern portion and the bar of the second test pattern portion overlap in the cross-track direction and are printed with jets in an overlap region between the jetting modules. The printed test patterns are analyzed to determine a stitch score that represents a degree of alignment between the slot in the first test pattern portion and the bar in the second test pattern portion. An aim offset value is determined where the slot and the bar are aligned.

16 Claims, 32 Drawing Sheets

| Mask Number | 0% | 10% | 20% | 30% | 40% | 50% | 60% | 70% | 80% | 90% | 100% |
|---|---|---|---|---|---|---|---|---|---|---|---|
| 0 | 0 | 0.1 | 0.2 | 0.3 | 0.4 | 0.5 | 0.6 | 0.7 | 0.8 | 0.9 | 1 |
| 1 | 0 | 0.2 | 0.3 | 0.5 | 0.6 | 0.7 | 0.8 | 1 | 1.1 | 1.2 | 1.3 |
| 2 | 0 | 0.3 | 0.5 | 0.6 | 0.8 | 0.9 | 1.1 | 1.2 | 1.4 | 1.5 | 1.7 |
| 3 | 0 | 0.5 | 0.6 | 0.8 | 1 | 1.1 | 1.3 | 1.5 | 1.7 | 1.8 | 2 |
| 4 | 0 | 0.6 | 0.8 | 1 | 1.2 | 1.4 | 1.6 | 1.8 | 1.9 | 2.1 | 2.3 |
| 5 | 0 | 0.7 | 0.9 | 1.1 | 1.4 | 1.6 | 1.8 | 2 | 2.2 | 2.4 | 2.7 |
| 6 | 0 | 0.8 | 1.1 | 1.3 | 1.6 | 1.8 | 2 | 2.3 | 2.5 | 2.8 | 3 |
| 7 | 0 | 1 | 1.2 | 1.5 | 1.8 | 2 | 2.3 | 2.5 | 2.8 | 3.1 | 3.3 |
| 8 | 0 | 1.1 | 1.4 | 1.7 | 1.9 | 2.2 | 2.5 | 2.8 | 3.1 | 3.4 | 3.7 |
| 9 | 0 | 1.2 | 1.5 | 1.8 | 2.1 | 2.4 | 2.8 | 3.1 | 3.4 | 3.7 | 4 |
| 10 | 0 | 1.3 | 1.7 | 2 | 2.3 | 2.7 | 3 | 3.3 | 3.7 | 4 | 4.3 |
| 11 | 0 | 1.5 | 1.8 | 2.2 | 2.5 | 2.9 | 3.2 | 3.6 | 4 | 4.3 | 4.7 |
| 12 | 0 | 1.6 | 2 | 2.3 | 2.7 | 3.1 | 3.5 | 3.9 | 4.2 | 4.6 | 5 |
| 13 | 0 | 1.7 | 2.1 | 2.5 | 2.9 | 3.3 | 3.7 | 4.1 | 4.5 | 4.9 | 5.3 |
| 14 | 0 | 1.8 | 2.3 | 2.7 | 3.1 | 3.5 | 4 | 4.4 | 4.8 | 5.2 | 5.7 |
| 15 | 0 | 1.9 | 2.4 | 2.8 | 3.3 | 3.7 | 4.2 | 4.6 | 5.1 | 5.5 | 6 |

REQUIRED FILL

242

| | 0% | 10% | 20% | 30% | 40% | 50% | 60% | 70% | 80% | 90% | 100% |
|---|---|---|---|---|---|---|---|---|---|---|---|
| | | | | | | DENSITY | | | | | |
| CYAN | 0.45 | 0.82 | 1.19 | 1.56 | 1.94 | 2.31 | 2.68 | 3.05 | 3.42 | 3.79 | 4.17 |
| MAGENTA | 0.58 | 0.84 | 1.10 | 1.36 | 1.62 | 1.87 | 2.13 | 2.39 | 2.65 | 2.91 | 3.16 |
| YELLOW | 0.77 | 1.01 | 1.26 | 1.51 | 1.76 | 2.01 | 2.25 | 2.50 | 2.75 | 3.00 | 3.24 |
| BLACK | 0.90 | 0.98 | 1.06 | 1.15 | 1.23 | 1.32 | 1.40 | 1.49 | 1.57 | 1.66 | 1.74 |

CLOSEST MASK NUMBER

244

| | 0% | 10% | 20% | 30% | 40% | 50% | 60% | 70% | 80% | 90% | 100% |
|---|---|---|---|---|---|---|---|---|---|---|---|
| | | | | | | DENSITY | | | | | |
| CYAN | 0 | 6 | 7 | 7 | 8 | 8 | 9 | 9 | 9 | 9 | 10 |
| MAGENTA | 0 | 6 | 6 | 6 | 6 | 6 | 6 | 6 | 6 | 6 | 6 |
| YELLOW | 0 | 7 | 7 | 7 | 7 | 7 | 7 | 7 | 7 | 7 | 7 |
| BLACK | 0 | 7 | 6 | 5 | 4 | 4 | 3 | 3 | 3 | 2 | 2 |

| Mask Number | Density | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 1 | 2 | 3 | 4 | 5 | 6 | 7 | 8 | 9 | 10 |
| 1 | 0 | 2 | 3 | 5 | 6 | 7 | 8 | 10 | 10 | 10 | 10 |
| 2 | 0 | 3 | 5 | 6 | 8 | 9 | 10 | 10 | 10 | 10 | 10 |
| 3 | 0 | 5 | 6 | 8 | 10 | 10 | 10 | 10 | 10 | 10 | 10 |
| 4 | 0 | 6 | 8 | 10 | 10 | 10 | 10 | 10 | 10 | 10 | 10 |
| 5 | 0 | 7 | 9 | 10 | 10 | 10 | 10 | 10 | 10 | 10 | 10 |
| 6 | 0 | 8 | 10 | 10 | 10 | 10 | 10 | 10 | 10 | 10 | 10 |
| 7 | 0 | 10 | 10 | 10 | 10 | 10 | 10 | 10 | 10 | 10 | 10 |
| 8 | 0 | 10 | 10 | 10 | 10 | 10 | 10 | 10 | 10 | 10 | 10 |
| 9 | 0 | 10 | 10 | 10 | 10 | 10 | 10 | 10 | 10 | 10 | 10 |
| 10 | 0 | 10 | 10 | 10 | 10 | 10 | 10 | 10 | 10 | 10 | 10 |
| 11 | 0 | 10 | 10 | 10 | 10 | 10 | 10 | 10 | 10 | 10 | 10 |
| 12 | 0 | 10 | 10 | 10 | 10 | 10 | 10 | 10 | 10 | 10 | 10 |
| 13 | 0 | 10 | 10 | 10 | 10 | 10 | 10 | 10 | 10 | 10 | 10 |
| 14 | 0 | 10 | 10 | 10 | 10 | 10 | 10 | 10 | 10 | 10 | 10 |
| 15 | 0 | 10 | 10 | 10 | 10 | 10 | 10 | 10 | 10 | 10 | 10 |

| Mask Number | Density | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 1 | 3 |
| 5 | 0 | 0 | 0 | 0 | 0 | 2 | 3 | 3 | 2 | 4 | 7 |
| 6 | 0 | 0 | 0 | 0 | 1 | 4 | 5 | 5 | 5 | 8 | 10 |
| 7 | 0 | 0 | 0 | 2 | 3 | 7 | 8 | 8 | 8 | 10 | 10 |
| 8 | 0 | 0 | 0 | 3 | 5 | 9 | 10 | 10 | 10 | 10 | 10 |
| 9 | 0 | 0 | 1 | 5 | 7 | 10 | 10 | 10 | 10 | 10 | 10 |
| 10 | 0 | 0 | 3 | 7 | 9 | 10 | 10 | 10 | 10 | 10 | 10 |
| 11 | 0 | 0 | 4 | 8 | 10 | 10 | 10 | 10 | 10 | 10 | 10 |
| 12 | 0 | 0 | | | | | | | | | |
| 13 | 0 | 0 | | | | | | | | | |
| 14 | 0 | 0 | | | | | | | | | |
| 15 | 0 | 0 | | | | | | | | | |

| Mask Number | Density | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 |
| 10 | 0 | 0 | 0 | 0 | 0 | 0 | 0 | 1 | 2 | 3 | 3 |
| 11 | 0 | 0 | 0 | 0 | 0 | 0 | 0 | 4 | 5 | 6 | 7 |
| 12 | 0 | 0 | 0 | 0 | 0 | 0 | 2 | 6 | 8 | 9 | 10 |
| 13 | 0 | 0 | 0 | 0 | 0 | 0 | 0 | 0 | 10 | 10 | 10 |
| 14 | 0 | 0 | 0 | 0 | 0 | 0 | 0 | 0 | 0 | 10 | 10 |
| 15 | 0 | 0 | 0 | 0 | 0 | 0 | 0 | 0 | 0 | 10 | 10 |

*FIG. 15C*

| Mask Number | Density | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 2 | 3 |
| 2 | 0 | 0 | 0 | 0 | 0 | 0 | 1 | 2 | 4 | 5 | 7 |
| 3 | 0 | 0 | 0 | 0 | 2 | 1 | 3 | 5 | 7 | 8 | 10 |
| 4 | 0 | 0 | 0 | 1 | 4 | 4 | 6 | 8 | 9 | 10 | 10 |
| 5 | 0 | 0 | 1 | 3 | 6 | 6 | 8 | 10 | 10 | 10 | 10 |
| 6 | 0 | 0 | 2 | 5 | 8 | 8 | 10 | 10 | 10 | 10 | 10 |
| 7 | 0 | 1 | 4 | 7 | 9 | 10 | 10 | 10 | 10 | 10 | 10 |
| 8 | 0 | 2 | 5 | 8 | 10 | 10 | 10 | 10 | 10 | 10 | 10 |
| 9 | 0 | 3 | 7 | 10 | 10 | 10 | 10 | 10 | 10 | 10 | 10 |
| 10 | 0 | 5 | 8 | 10 | 10 | 10 | 10 | 10 | 10 | 10 | 10 |
| 11 | 0 | 6 | 10 | 10 | 10 | 10 | 10 | 10 | 10 | 10 | 10 |
| 12 | 0 | 7 | 10 | 10 | 10 | 10 | 10 | 10 | 10 | 10 | 10 |
| 13 | 0 | 8 | 10 | 10 | 10 | 10 | 10 | 10 | 10 | 10 | 10 |
| 14 | 0 | 9 | 10 | 10 | 10 | 10 | 10 | 10 | 10 | 10 | 10 |
| 15 | 0 | 9 | 10 | 10 | 10 | 10 | 10 | 10 | 10 | 10 | 10 |

| | Density | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 1 | 1 | 3 |
| 7 | 0 | 0 | 0 | 0 | 0 | 0 | 0 | 1 | 4 | 4 | 7 |
| 8 | 0 | 0 | 0 | 0 | 0 | 1 | 2 | 3 | 7 | 7 | 10 |
| 9 | 0 | 0 | 0 | 0 | 1 | 3 | 5 | 6 | 10 | 10 | 10 |
| 10 | 0 | 0 | 0 | 0 | 3 | 5 | 7 | 9 | 10 | 10 | 10 |
| 11 | 0 | 0 | 0 | 0 | 3 | 5 | 10 | 10 | 10 | 10 | 10 |
| 12 | 0 | 0 | 0 | 0 | 3 | 7 | 10 | 10 | 10 | 10 | 10 |
| 13 | 0 | 0 | 0 | 0 | 3 | 7 | 10 | 10 | 10 | 10 | 10 |
| 14 | 0 | 0 | 0 | 0 | 3 | 7 | 10 | 10 | 10 | 10 | 10 |
| 15 | 0 | 0 | 0 | 0 | 3 | 7 | 10 | 10 | 10 | 10 | 10 |

Mask Number (rows), R2

*FIG. 15E*

| Mask Number | \multicolumn{11}{c}{Density} | | | | | | | | | | |
|---|---|---|---|---|---|---|---|---|---|---|---|
| | 0% | 10% | 20% | 30% | 40% | 50% | 60% | 70% | 80% | 90% | 100% |
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 3 |
| 14 | 0 | 0 | 0 | 0 | 0 | 0 | 0 | 0 | 0 | 2 | 7 |
| 15 | 0 | 0 | 0 | 0 | 0 | 0 | 0 | 0 | 1 | 5 | 10 |

IN-TRACK STITCHING ERROR CORRECTION

CROSS-REFERENCE TO RELATED APPLICATIONS

Reference is made to commonly assigned, co-pending U.S. patent application Ser. No. 18/212,762, entitled "Image-adaptive inkjet printhead stitching process," by M. Holl et al., and U.S. patent application Ser. No. 18/390,140, entitled: "Cross-track stitching error correction," by J. Ludwicki et al., each of which is incorporated herein by reference.

FIELD OF THE INVENTION

This invention pertains to the field of digital printing and more particularly to a method for in-track stitching error correction when printing image data in an inkjet printer with a plurality of overlapping jetting modules.

BACKGROUND OF THE INVENTION

FIG. 1 shows a diagram illustrating an exemplary multi-channel digital printing system 10 for printing on a web of receiver medium 14. The printing system 10 includes a plurality of printing modules 12, each adapted to print image data for an image plane corresponding to a different color channel. In some printing systems 10, the printing modules 12 are inkjet printing modules adapted to print drops of ink onto the receiver medium 14 through an array of inkjet nozzles (also referred to as "jets"). Alternately, the printing modules 12 can utilize any type of digital printing technology known in the art.

In the illustrated example, the printing modules 12 print cyan (C), magenta (M), yellow (Y) and black (K) colorants (e.g., inks) onto the receiver medium 14 as it is transported through the printing system using a media transport system (not shown in FIG. 1) from upstream (left in FIG. 1) to downstream (right in FIG. 1) in a in-track direction 16. (The in-track direction 16 is sometimes referred to as the "receiver motion direction," and the direction perpendicular to the in-track direction 16 is commonly referred to as the cross-track direction 17.) In other cases, the printing modules 12 can be adapted to print different numbers and types of colorants. For example, additional printing modules 12 can be used to print specialty colorants, or extended gamut colorants. In some cases, a plurality of the printing modules 12 can be used to print the same colorant (e.g., black), or density variations of the same color (e.g., gray and black). In some cases, the printing system 10 is adapted to print double-sided pages. In this case, one or more of the printing modules 12 can be arranged to print on a back side of the receiver medium 14, for example after the receiver medium 14 passes through a turnover mechanism which turns the media over. Such turnover mechanisms are well-known in the printing art.

The exemplary printing system 10 also includes dryers 18 for drying the ink applied to the receiver medium 14 by the printing modules. While the exemplary printing system 10 illustrates a dryer 18 following each of the printing modules 12, this is not a requirement. In some cases, a single dryer 18 may be used following the last printing module 12, or dryers 18 may only be provided following some subset of the printing modules 12. Depending on the printing technology used in the printing modules 12, and the printing speed, it may not be necessary to use any dryers 18.

Downstream of some or all of the printing modules 12, an imaging system 20 is preferably provided, which can include one or more imaging devices 22 can be used for capturing images of printed image content on the receiver medium 14. In some cases, the imaging system 20 can include a single imaging device 22 that captures an image of the entire width of the receiver medium 14, or of a relevant portion thereof. In other cases, a plurality of imaging devices 22 can be used, each of which captures an image of a corresponding portion of the printed image. In some embodiments, the position of the imaging devices 22 can be adjusted during a calibration process to sequentially capture images of different portions of the receiver medium 14. For cases where the printing system 10 prints double-sided images, some of the imaging devices 22 may be adapted to capture images of a second side of the receiver medium 14.

In some cases, the imaging devices 22 can be digital camera systems adapted to capture 2-D images of the receiver medium 14. In other embodiments, the imaging devices 22 can include 1-D linear sensors that are used to capture images of the receiver medium 14 on a line-by-line basis as the receiver medium 14 moves past the imaging system 20. The imaging devices 22 can equivalently be referred to as "cameras" or "camera systems" or "scanners" or "scanning systems," independent of whether they utilize 2-D or 1-D imaging sensors. Similarly, the images provided by the imaging devices 22 can be referred to as "captured images" or "scanned images" or "scans." In some cases, the imaging devices 22 include color sensors for capturing color images of the receiver medium, to more easily distinguish between the colorants deposited by the different printing modules 12. In other cases, the imaging devices 22 can include monochrome sensors. In such cases, the color of light used to illuminate the receiver medium 14 can be adjusted depending on the color of the colorant(s) being imaged. For example, red LEDs can be used to illuminate test patterns printed with cyan ink, etc.

FIG. 2 is a diagram of an exemplary printing module 12. In this configuration, the printing module 12 is an inkjet printing system that includes a plurality of jetting modules 30 arranged across a width dimension of the receiver medium 14 in a staggered array configuration. (The width dimension of the receiver medium 14 is the dimension in the cross-track direction 17.) Such inkjet printing modules 12 are sometimes referred to as "lineheads." The jetting modules 30 are sometimes referred to as "printheads."

Each of the jetting modules 30 includes a plurality of inkjet nozzles (i.e., "jets") arranged in nozzle array 31, and is adapted to print a swath of image data in a corresponding printing region 32. In the illustrated example, the nozzle arrays 31 are one-dimensional linear arrays, but the invention is also applicable to inkjet jetting modules 30 having jets arrayed in two-dimensional arrays as well. Common types of inkjet jetting modules 30 include continuous inkjet (CI) printheads and drop-on-demand (DOD) printheads. Commonly, the inkjet jetting modules 30 are arranged in a spatially-overlapping arrangement where the printing regions 32 overlap in overlap regions 34. Each of the overlap regions 34 has a corresponding centerline 36. In the overlap regions 34, jets from more than one nozzle array 31 can be used to print the image data.

Stitching is a process that refers to the merging/alignment of the printed image data produced from a plurality of jetting modules 30 for the purpose of creating the appearance of a single page-width line head. For example, as shown in FIG. 2, six jetting modules 30, each approximately four inches in length, can be stitched together in the overlap regions 34 to form a page-width printing module 12 having a printing width of about 24 inches. The page-width image data is processed and segmented into separate portions that are sent to each jetting module 30 with appropriate time delays to account for the staggered positions of the jetting modules 30. The image data portions printed by each of the jetting modules 30 is sometimes referred to as "swaths." Stitching systems and algorithms are used to determine which jets of each nozzle array 31 should be used for printing in the overlap region 34. Preferably, the stitching algorithms create a boundary between the printing regions 32 that is not readily detected by eye.

One problem which is common in printing systems 10 that include a plurality of jetting modules 30 is alignment of the image data printed by the different jetting modules 30. There are a variety of different types of alignment errors that can occur. For color printing systems 10 having a plurality of different printing modules 12, the image data printed by one printing module 12 (e.g., a first color channel) can be misaligned with the image data printed by a second printing module 12 (e.g., a second color channel). These color-to-color alignment errors can occur in either or both of the in-track direction 16 or the cross-track direction 17. Similarly, for printing modules 12 that include a plurality of jetting modules 30 the image data printed by one jetting module 30 can be misaligned with the image data printed by a second jetting module 30. Such jetting module-to-jetting module alignment errors can also occur in either or both of the in-track direction 16 or the cross-track direction 17.

The alignment errors can result from a variety of different causes. In some cases, the alignment can result from variations in the geometry of the jetting modules 30 during manufacturing, or variations in the positioning of the jetting modules 30 within the printing system 10. In other cases, alignment errors can result from interactions between the printing system 10 and the environment (e.g., airflow perturbations can cause ink drops to be misdirected in inkjet printing systems). Another common source of misalignment is dimensional changes in the receiver medium 14 that can occur as the receiver medium 14 moves between different printing modules 12. For example, the absorption of water in the ink printed by one channel can cause the receiver medium 14 to expand before a subsequent channel is printed. Similarly, when the receiver medium 14 passes through a dryer 18, this can cause the receiver medium 14 to shrink. Such dimensional changes in the receiver medium 14 will generally be a function of a variety of factors such as media type, image content of the printed image, and environmental conditions. Dimensional changes can also result from other types of processing operations that are performed between the printing of one channel and another. For example, the receiver medium 14 can be shifted or stretched as it passes through components (e.g., turnover mechanisms) along the media path.

A variety of different methods have been proposed in the prior art to detect and correct for such alignment errors. Typically, the methods involve printing test patterns and capturing images of the printed test patterns to characterize the alignment errors. Appropriate adjustments can then be made to correct for the alignment errors. In some cases, the adjustments can involve adjusting the physical positions of system components (e.g., the printing modules). In other cases, the adjustments can involve modifying the image data sent to the jetting modules 30 (e.g., by shifting the image data or modifying which jets are used to print the image data) or modifying time delays between the time that the image data is printed by one jetting module 30 and the time that the corresponding image data is printed by another jetting module 30.

Due to mechanical tolerances in the manufacturing process, it may be difficult to maintain an accurate alignment between the jetting modules 30 in a printing module 12. Moreover, even if the jetting modules 30 are perfectly aligned, differences in the aim of individual jets in the nozzle arrays 31 may make them appear to be misaligned in the printed image. Any such alignment errors can produce visible artifacts in the printed image.

Alignment errors between the jetting modules 30 in the cross-track direction can result in artifacts being produced at the boundaries between the printheads (e.g., dark streaks where the multiple jets print at the same cross-track location, or light streaks where no jets print at a particular cross-track location). Alignment errors between the jetting modules 30 in the in-track direction can result in artifacts being produced where portions of a linear feature in the image that spans the overlap region don't align with each other and appear to be broken.

U.S. Pat. No. 6,068,362 to Dunand et al., entitled "Continuous multicolor ink jet press and synchronization process for the press," discloses a method for synchronizing printheads of a printing system. The printing system includes a plurality of printheads with optical sensors mounted "before" each printhead (i.e., upstream) at some predetermined distance. A print media passes beneath the printheads in order to permit the printheads to print marks thereon. The optical sensors capture an image of the marks which are input into a synchronization circuit. The synchronization circuit determines whether any deviation from the desired target is present. If there is a deviation, the synchronization circuit modifies the line spacing of the printhead of interest in order to compensate for the inaccuracies. In this system, the adjusted line spacings are based on an output of an encoder attached to the paper drive motor. Such a system requires extremely high-cost encoders to provide the resolution needed for the registration demands of a printer system. It also is subject to errors associated with slip or coupling between the motor and the motion of the paper through the print zone. This system is also very susceptible to errors produced by variations in motor speed such as wow and flutter. In this configuration, there is an inherent time lag from image capture until the media passes beneath the printhead. This time lag in and of itself introduces another variable which is also subject to deviation from its desired target.

European patent document EP0729846B1 by Piatt et al., entitled "Printed reference image compensation system," which is incorporated herein by reference, discloses a similar method for aligning the images for a plurality of different color channels in a multi-color printing system. Registration marks are printed in the margin of the image as the print media passes beneath each printhead. A camera positioned before a second printhead captures an image of the registration mark printed by a first printhead. This permits the second printhead to adjust its printing if a deviation in the expected position of the registration mark is detected from the captured image.

U.S. Pat. No. 7,118,188 to Vilanova et al., entitled "Hardcopy apparatus and method," makes use of the redundancy of jets in the overlap region 34 to correct for cross-track alignment errors. Different masks are provided that use different jets in the overlap regions 34. In some embodiments, an appropriate mask can be selected by measuring the width of the band artifact produced in the overlap regions 34 for a printed image. In other embodiments, a test pattern is printed which includes different areas corresponding to a set of masks. The optimal mask is then selected by visual evaluation or automatic evaluation with an optical scanner for use in subsequent printing operations.

Commonly-assigned U.S. Pat. No. 8,104,861 to Saettel et al., entitled "Color to color registration target," which is incorporated herein by reference, discloses a method for calibrating a multi-color inkjet printing system. A test target is printed that includes three marks printed with a first color in which two of the three marks are aligned along a first axis, and the third mark is offset by a predetermined distance along a second axis. The test target includes a fourth mark printed with a second color in which the intended position is aligned along the first axis with one of the first three marks, and is aligned along the second axis with another of the first three marks. The locations of the printed marks are detected and used to determine an appropriate alignment correction needed to align the first and second colors.

Commonly-assigned U.S. Pat. No. 8,123,326 to Saettel et al., entitled "Calibration system for multi-printhead ink systems," which is incorporated herein by reference, discloses a calibration method to correct for alignment errors in an inkjet printer having multiple printheads. The method includes printing a first test mark using a first printhead and a second test mark using a second printhead. The nominal positions of the first and second marks are separated by a predetermined spacing in the cross-track direction, and are aligned in the in-track direction. An image capture device is used to determine the positions of the printed marks, and an error factor is determined based on the position of the second mark relative to the first mark. The pulse train used to control the second printhead is shifted responsive to the error factor to correct in-track alignment errors. One limitation of this method is that the necessary separation between the first test mark and the second test mark in the cross-track direction means that the in-track alignment of the printed image data will only be perfectly corrected at those cross-track positions. This does not ensure that the printed image data will be perfectly aligned at the boundaries between the printheads (e.g., at centerlines 36 in FIG. 2).

Commonly-assigned U.S. Pat. No. 8,842,330 to Enge, entitled "Method to determine an alignment errors in image data and performing in-track alignment errors correction using test pattern," discloses a method for aligning image data printed on a receiver medium in a multi-printhead printer. The method includes printing a test pattern including features separated by predefined test pattern feature separations, where some features are printed with a first printhead and some features printed with a second printhead. An image of the printed test pattern is analyzed to determine a first camera pixel separation between two features printed with the first printhead, which is used to determine a camera scale factor. The camera scale factor is used to scale a second camera pixel separation between a feature printed with first printhead and a feature printed with the second printhead. The scaled second camera pixel separation is compared to a corresponding test pattern feature separation to determine an alignment error, which is used to adjust the alignment of the image data printed with at least one of the printheads.

Commonly-assigned U.S. Pat. No. 7,871,145 to Enge, entitled "Printing method for reducing stitch error between overlapping jetting modules," and related U.S. Pat. No. 8,393,709 to Enge, entitled "Printing method for reducing stitch error between overlapping jetting modules," which are incorporated herein by reference disclose a stitching algorithm describe a method for correcting misalignment between jetting modules. In a set-up procedure, a test pattern is printed using the jets of adjacent jetting modules, and the pattern is analyzed to detect a stitch error in the overlap regions. The results of this analysis are used to calculate a set of correction values to be applied to print data subsequently sent to jets of the adjacent jetting modules to make a correction for the stitch error. During a subsequent production run, the print data sent to the jets of the adjacent jetting modules is analyzed to sense an image content attribute, such as gray or density level, of the print data. The results of the analysis of the print data are then used to calculate a dynamic adjustment that is used to adjust the set of correction values calculated during the set-up procedure. The line head is then used to print the corrected print data by applying the set of adjusted correction values to production print data subsequently sent to the jetting modules.

Commonly-assigned U.S. Pat. No. 8,760,712 to Enge et al., entitled "Modifying print data using matching pixel patterns," together with related U.S. Pat. Nos. 8,845,059 and 8,857,938, each of which are incorporated herein by reference, disclose a method for aligning multi-channel digital image data for a digital printer having a plurality of printheads. A test pattern including test pattern indicia printed using individual printheads is scanned and analyzed to detect locations of the printed test pattern indicia. One of the printheads is designated to be a reference printhead, and one or more of the other printheads are designated to be non-reference printheads. Spatial adjustment parameters are determined for each of the non-reference printheads responsive to the detected test pattern indicia locations. Digital image data for the non-reference printheads is modified by designating an input pixel neighborhood within which an image pixel should be inserted or deleted, comparing the image pixels in the input pixel neighborhood to a plurality of predefined pixel patterns to identify a matching pixel pattern; and determining a modified pixel neighborhood responsive to the matching pixel pattern.

Commonly-assigned U.S. Pat. No. 8,842,331 to Enge, entitled "Multi-print head printer for detecting alignment errors and aligning image data reducing swath boundaries," which is incorporated herein by reference, discloses a multi-printhead printing system, including first and second printheads adapted to print on a receiver medium. An alignment process includes printing a test pattern including features separated by predefined test pattern feature separations, where some features are printed with a first printhead and some features printed with a second printhead. An image of the printed test pattern is analyzed to determine a first camera pixel separation between two features printed with the first printhead, which is used to determine a camera scale factor. The camera scale factor is used to scale a second camera pixel separation between a feature printed with first printhead and a feature printed with the second printhead. The scaled second camera pixel separation is compared to a corresponding test pattern feature separation to determine an alignment error, which is used to adjust the alignment of the image data printed with at least one of the printheads.

While performing adequately in many situations, the prior art stitching methods have the limitation that they don't fully account for the density-dependence of the stitching characteristics. There remains a need for improved methods for aligning image data printed on a receiver medium using two printheads in a multi-printhead printer that overcomes the limitations of the prior art.

SUMMARY OF THE INVENTION

The present invention represents a method of reducing in-track stitch errors in an inkjet printer including a plurality of jetting modules that are staggered in an in-track direction such that adjacent jetting modules partially overlap in an overlap region, each of the plurality of jetting modules including a plurality of jets wherein some of the jets of adjacent jetting modules are overlapping jets that overlap in the overlap region, including:
  a) applying test image print data to the linehead to produce a printed test image on a print media using the jets of adjacent jetting modules including the overlapping jets, wherein the test image print data includes:
    a test pattern for each of a plurality of in-track offset values, including:
      i) a first test pattern portion to be printed with a first of the adjacent jetting modules including a uniform density region having a slot with a slot width, the slot extending in a cross-track direction; and
      ii) a second test pattern portion to be printed with a second of the adjacent jetting modules including a bar having a bar width, the bar extending in the cross-track direction;
    wherein the bar width is substantially equal to the slot width;
    wherein the uniform density region of the first test pattern portion and the bar of the second test pattern portion overlap in the cross-track direction and are printed with jets in the overlap region; and
    wherein a nominal in-track position of the bar in each test pattern is offset from a nominal in-track position of the slot by the in-track offset value;
  b) digitizing the printed test pattern to determine digitized test pattern data;
  c) analyzing the digitized test pattern data for each in-track offset value in an analysis zone within the overlap region to determine a stitch score for each of the in-track offset values, wherein the stitch score represents a degree of alignment between the slot in the first test pattern portion and the bar in the second test pattern portion;
  d) analyzing the determined stitch scores to determine an aim offset value where the slot in the first test pattern portion is aligned with the bar in the second test pattern portion;
  e) determining an offset correction value responsive to the determined aim offset value, wherein the offset correction value is adapted to be applied to production image data subsequently printed using the adjacent jetting modules of the linehead to reduce in-track stitch errors.

This invention has the advantage that the test pattern provides a robust stitch score measurement representing the degree of alignment between adjacent jetting modules.

It has the additional advantage that averaging the results over a plurality of printed test images can account for variability in the in-track position of each of the adjacent jetting modules.

It has the further advantage that measuring the stitch scores at a plurality of in-track offsets and using a curve-fitting process to determine a stitch score function provides a more accurate determination of the aim offset value.

BRIEF DESCRIPTION OF THE DRAWINGS

FIG. 13 shows an exemplary table showing the fill level as a function of density and mask number;
FIG. 14 illustrates exemplary tables showing the required fill and the corresponding mask number as a function of density for each color channel;
FIGS. 15A-15F illustrate an exemplary set of mask tables.

Figure 1:
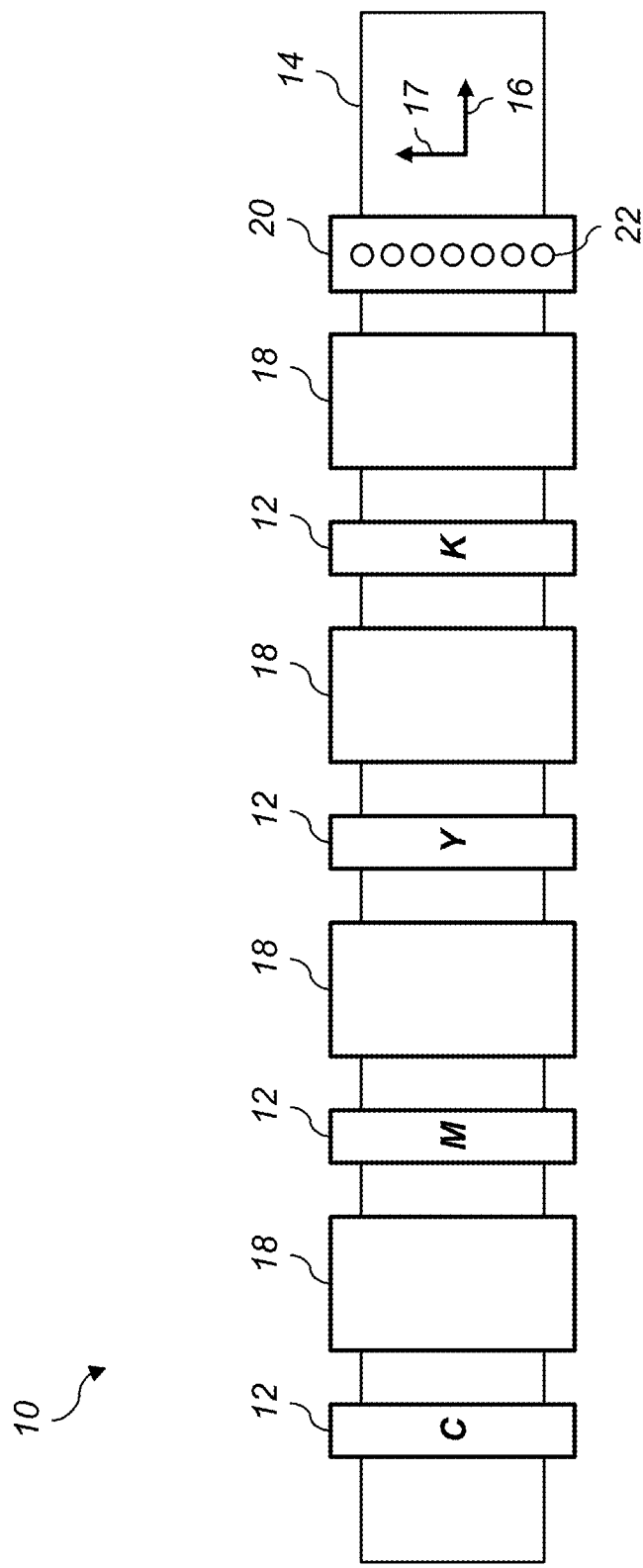
FIG. 1 is a diagram illustrating an exemplary multi-channel digital printing system.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present invention is well-suited for use in roll-fed inkjet printing systems, such as the printing system 10 described earlier with respect to FIG. 1, which utilize printing modules 12 (i.e., inkjet line heads) to apply colorant (e.g., ink) to a web of continuously moving receiver media 14. In such systems, the jetting modules 30 (FIG. 2) of the printing modules 12 selectively moisten at least some portion of the receiver medium 14 as it moves through the printing system 10, but without the need to make contact with the print medium 14. While the present invention will be described within the context of a roll-fed inkjet printing system, it will be obvious to one skilled in the art that it could also be used for other types of multi-printhead printing systems as well, including sheet-fed printing systems and electrophotographic printing systems.

In the context of the present invention, the terms "web media" or "continuous web of media" are interchangeable and relate to a receiver medium 14 (i.e., a print medium such as a paper or some other type of appropriate substrate) that is in the form of a continuous strip of media that is transported through the printing system 10 in an in-track direction 16 using a web media transport system from an entrance to an exit thereof. The continuous web media serves as the receiver medium 14 to which one or more colorants (e.g., inks), or other coating liquids are applied. This is distinguished from various types of "continuous webs" or "belts" that are actually media transport system components (as compared to the image receiving media) that are typically used to transport a cut sheet medium in an electrophotographic or other printing system. The terms "upstream" and "downstream" are terms of art referring to relative positions along the transport path of a moving web; points on the web move from upstream to downstream.

Additionally, as described herein, the example embodiments of the present invention provide a printing system or printing system components typically used in inkjet printing systems. However, many other applications are emerging which use inkjet printheads to emit liquids (other than inks) that need to be finely metered and deposited with high spatial precision. As such, as described herein, the terms "liquid" and "ink" and "colorant" can be taken to refer to any material that can be deposited by the jetting modules 30 described below. Likewise, the terms "printed image" and "print" can be taken to refer to any pattern of material deposited on a receiver medium.

In accordance with some exemplary embodiments of the present invention, a timing delay between image data printed using different jetting modules is modified to provide improved alignment in an in-track direction 16. In other embodiments, the digital image data provided to the jetting modules 30 is modified to provide improved alignment in the cross-track direction 17. In some cases, the jetting modules 30 being aligned are in a single printing module 12. In other cases, the jetting modules 30 being aligned are in different printing modules 12 (e.g., to perform color-to-color alignment).

Figure 2:
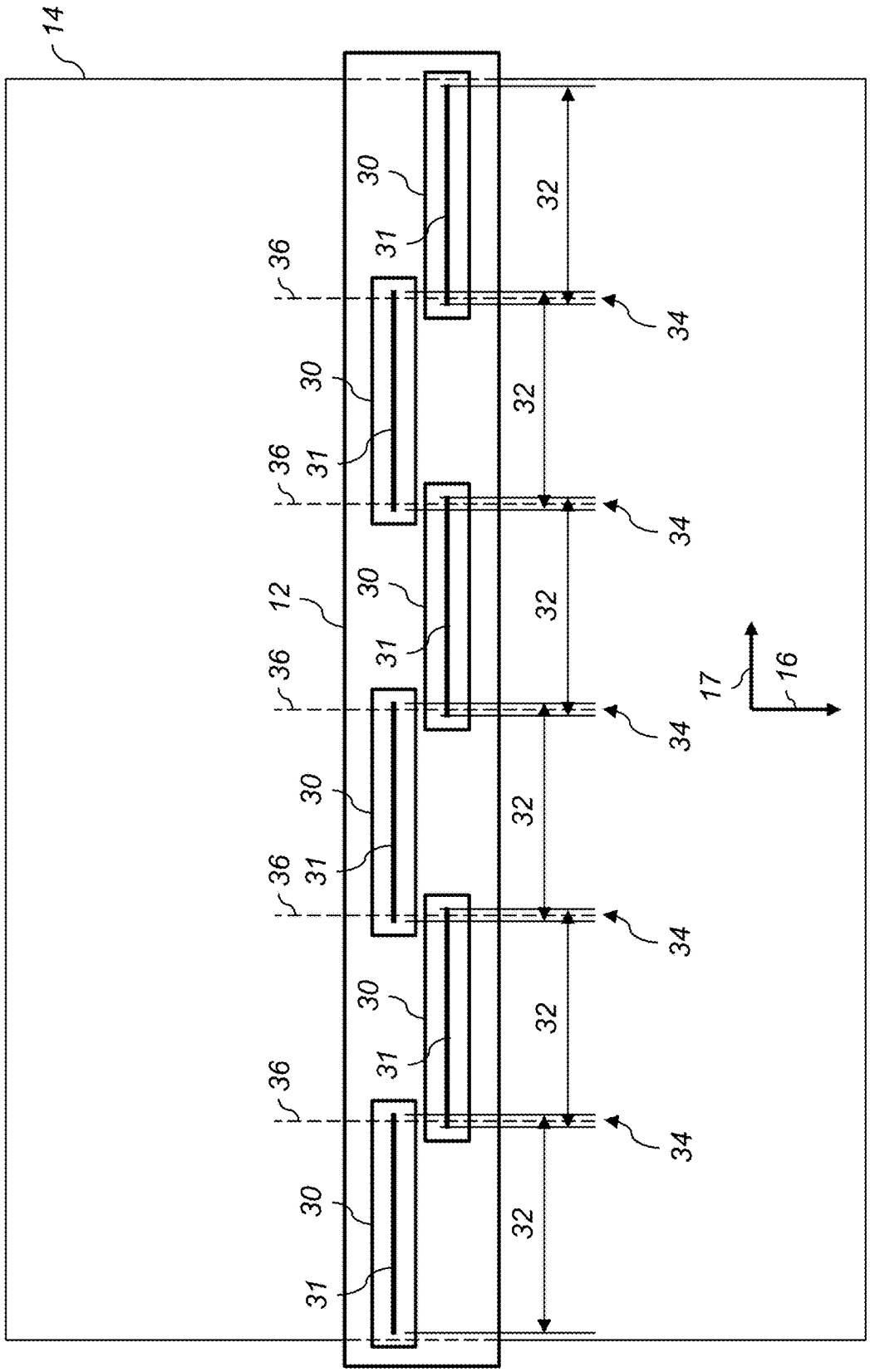
FIG. 2 is a diagram showing an exemplary printing module having a plurality of printheads.

Consider the case where it is desired to stitch together image data printed using a plurality of jetting modules 30 in a particular printing module 12 as illustrated in FIG. 2. The jetting modules 30 are staggered in an in-track direction such that adjacent jetting modules 30 partially overlap in the cross-track direction 17 in overlap regions 34. Within the overlap regions 34, some of the jets in the adjacent jetting modules 30 overlap with each other in the sense that they occupy the same range of cross-track positions. As the receiver medium 14 moves past the printing module 12 in the in-track direction 16 (i.e., the receiver medium direction), a particular in-track position on the receiver medium 14 will pass underneath the jets of the jetting modules 30 at different times. The printed image data formed by the different jetting modules 30 can be aligned by using appropriate time delays between the times that the image data is sent to the different jetting modules 30. Nominal time delays can be determined given a knowledge of the nominal transport velocity of the receiver medium 14 and the nominal positions of the jetting modules 30. However, due to manufacturing tolerances in the positions of the various system components, as well as other factors such as interactions with the printer environment (e.g., thermal expansion of system components and air currents that can affect the trajectory of ejected drops), alignment errors will typically result when images are printed using the nominal time delays.

Figure 3:
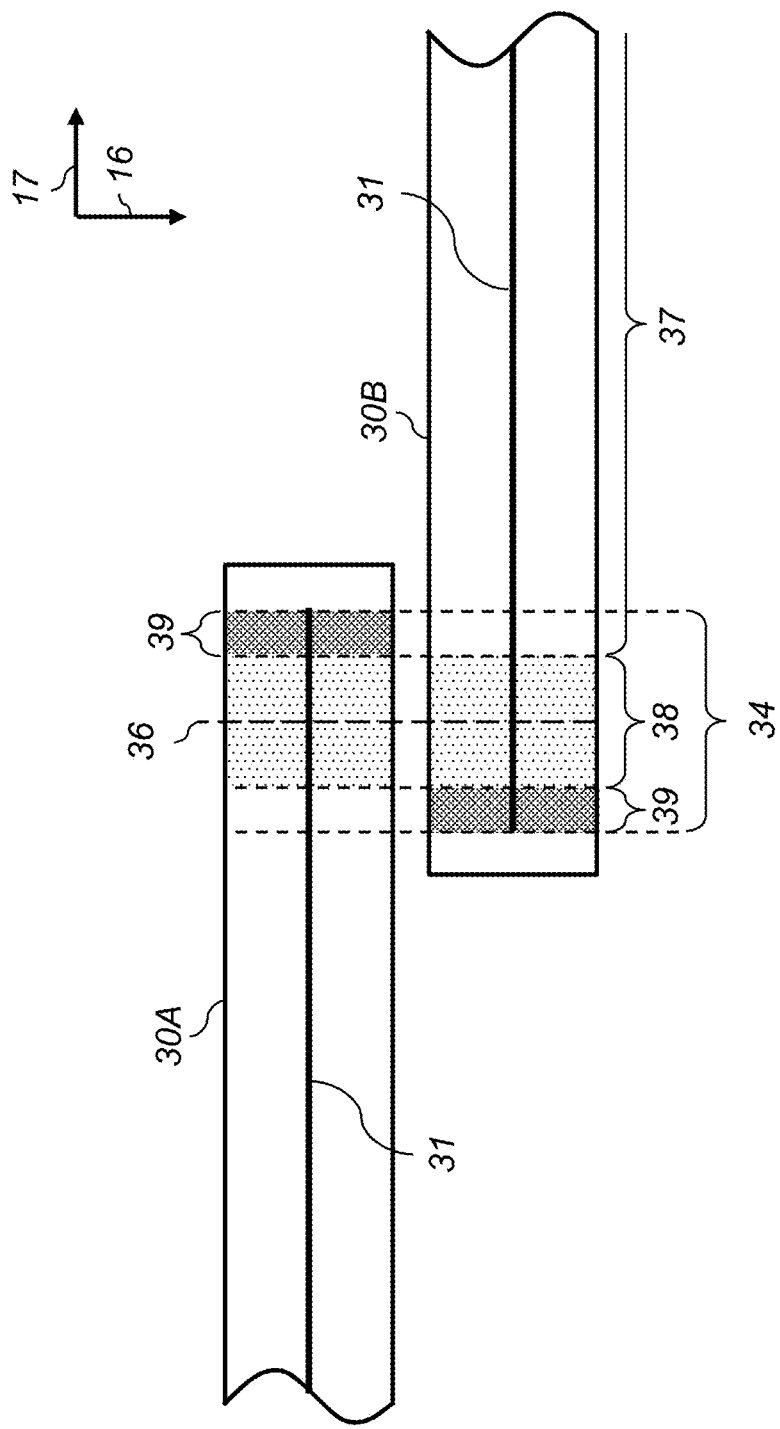
FIG. 3 shows an overlap region between two jetting modules.

FIG. 3 shows an enlarged view of one of the overlap regions 34 in FIG. 2 between a pair of jetting modules 30A, 30B. A subset of the jets (i.e., nozzles) in the overlap region 34 are designated to be stitch jets 38. The stitch jets 38 are used by the stitching algorithms to form the transitions between the jetting modules 30A, 30B in accordance with the methods of the present invention. The jets between the stitch jets 38 and the ends of the nozzle arrays 31 are designated to be guard jets 39 and are not used to print image data. In an exemplary embodiment, the jetting modules 30A, 30B have 2560 total jets with sixteen guard jets 39 and thirty-two stitch jets 38 at the ends of each jetting module 30A, 30B, leaving 2464 print jets 37 (for the jetting modules 30 that are not on the printing module 12). However, in other embodiments different numbers of jets can be used.

Figure 4:
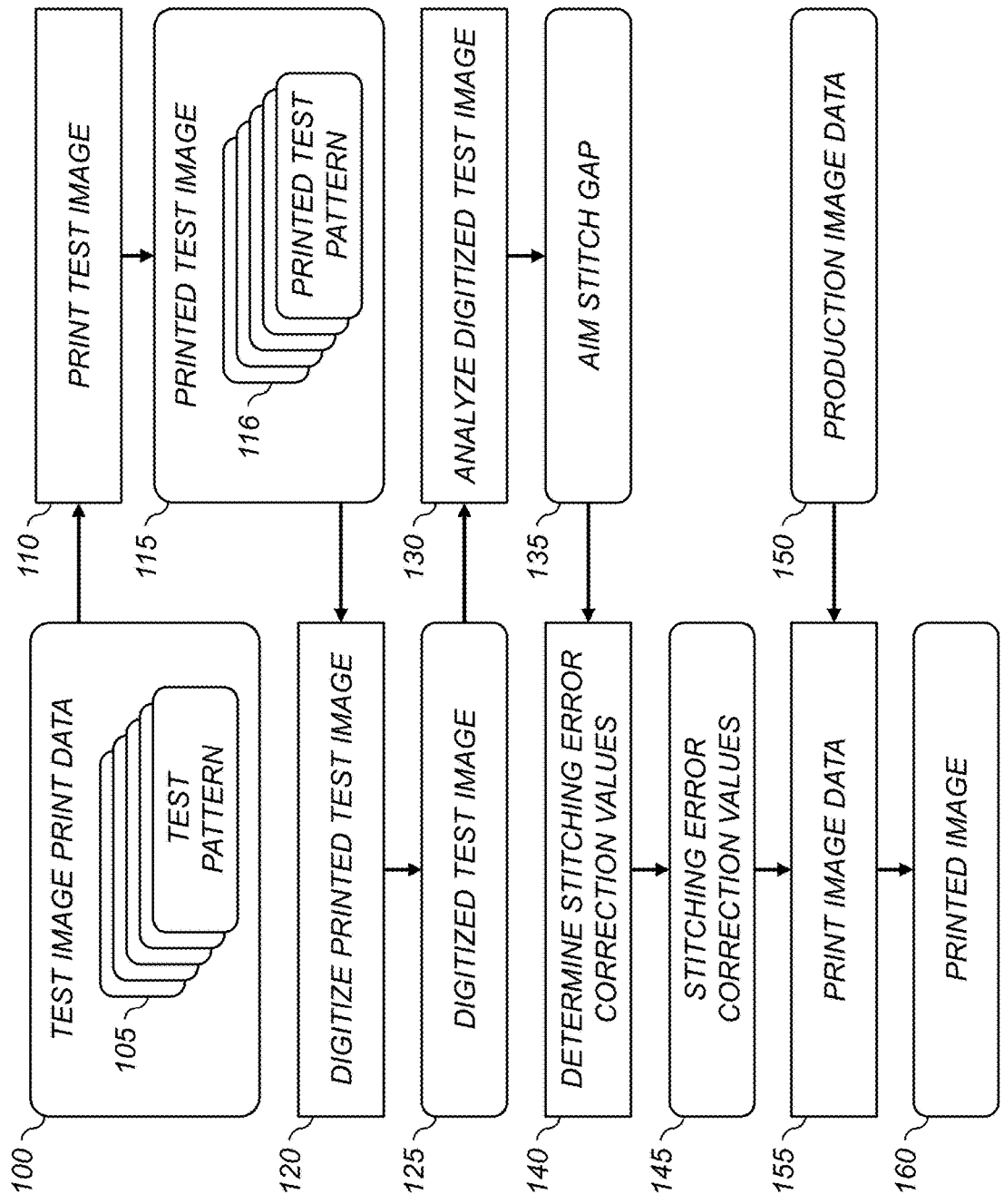
FIG. 4 is a flow-chart of a method for correction of cross-track stitching errors in accordance with an exemplary embodiment.

FIG. 4 shows a flow chart for a cross-track stitching correction method in accordance with an exemplary embodiment. A print test image step 110 is used to print test image print data 100 using a printing module 12 (FIG. 1) of a printing system 10 (FIG. 2) to provide a printed test image 115. In an exemplary embodiment, the test image print data 100 includes a plurality of test patterns 105 for performing cross-track stitching correction, and the printed test image 115 includes a corresponding plurality of printed test patterns 116.

Figure 5:
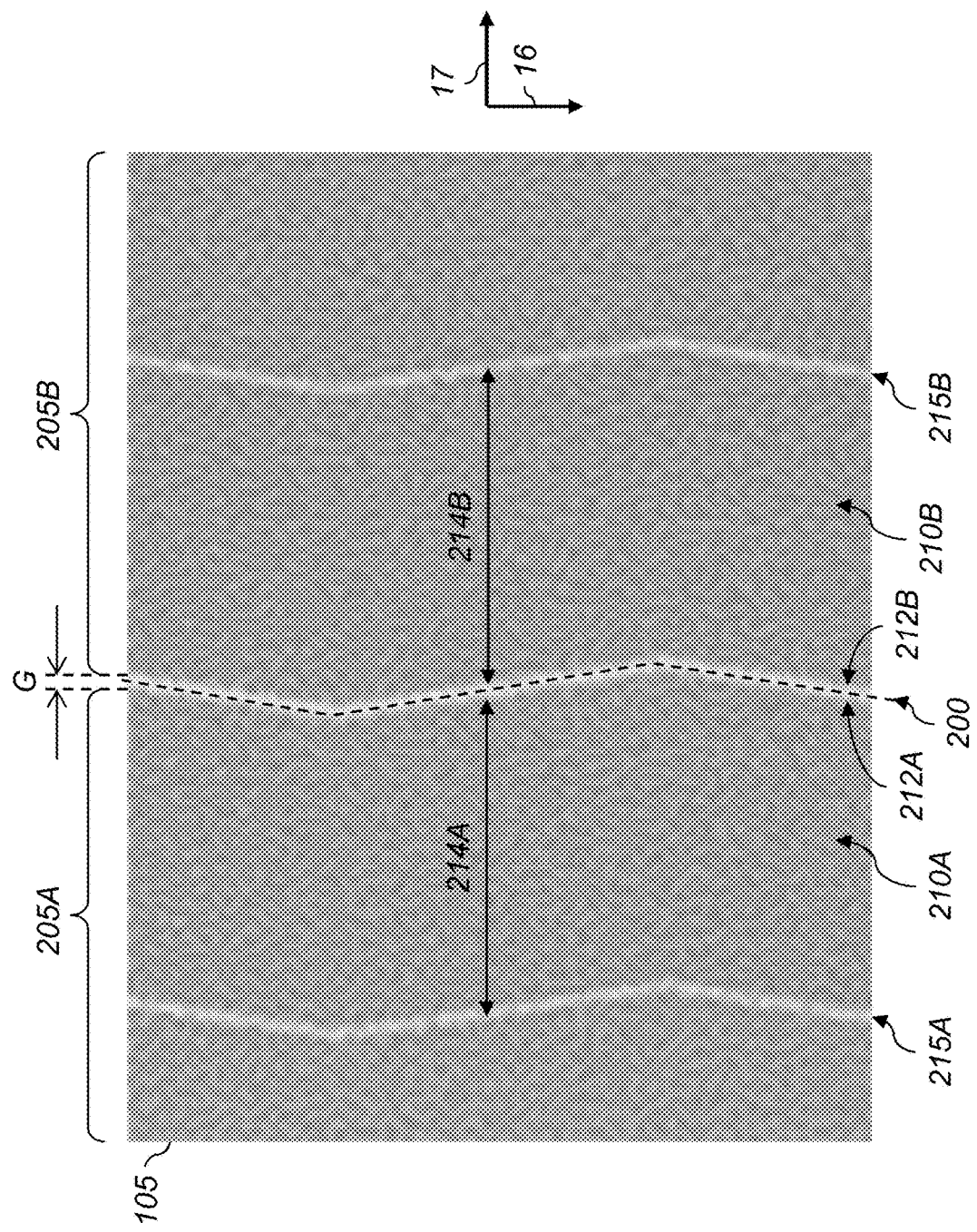
FIG. 5 shows an exemplary test pattern 105 useful for determining aim stitch gaps.

FIG. 5 shows a test pattern 105 in accordance with an exemplary embodiment to be printed at the boundary between a pair of adjacent jetting modules 30A, 30B (FIG. 3). The test pattern 105 includes a first test pattern portion 205A to be printed with a first of the adjacent jetting modules 30A, and a second test pattern portion 205B to be printed with a second of the adjacent jetting modules 30B. The two test pattern portions are separated by a stitching boundary 200.

In accordance with a preferred embodiment, the cross-track position of the stitching boundary 200 varies as a function of in-track position. In the illustrated example the stitching boundary 200 follows a zig-zag pattern including line segments of alternating slope. In other embodiments the stitching boundary 200 can take a variety of other forms such as a sinusoidal pattern or a simple angled linear pattern. The fact that the stitching boundary 200 spans a range of cross-track positions provides the advantage that the cross-track stitching correction method will be more robust to any anomalous jets in the jetting modules 30A, 30B.

The first test pattern portion 205A includes a first uniform density region 210A on the left side of the stitching boundary 200 having a specified region density level (e.g., 20% or 70%). A first region boundary 212A (i.e., the right-side edge) of the first uniform density region 210A is parallel to the stitching boundary 200. Note that within the context of this disclosure the term "parallel to" is generalized to mean that the two boundaries have the same shape and are separated from each other in the cross-track direction by a constant value. The first test pattern portion 205A also includes a first reference feature 215A positioned within the first uniform density region 210A. The first reference feature 215A has a specified density level that is different than the region density level of the first uniform density region 210A such that it can be easily detected. In the illustrated embodiment the first reference feature 215A has a lower density level (e.g., 0% coverage corresponding to the media color) than the first uniform density region 210A. The first reference feature 215A is spaced apart from and parallel to the first region boundary 210A in a left direction by a defined feature spacing 214A.

Similarly, the second test pattern portion 205B includes a second uniform density region 210B on the right side of the stitching boundary 200 having a specified region density level (e.g., 20% or 70%), which is preferably the same as the region density level of the first uniform density region 210A. A second region boundary 212B (i.e., the left-side edge) of the second uniform density region 210B is parallel to the stitching boundary 200. The second test pattern portion 205B also includes a second reference feature 215B positioned within the second uniform density region 210B. The second reference feature 215B is spaced apart from and parallel to the second region boundary 212B in a right direction by a defined feature spacing 214B. The feature spacing 214B is preferably the same as the feature spacing 214A.

The first region boundary 212A and the second region boundary 212B are spaced apart from each other by a predefined stitch gap G when the first and second jetting modules 30A, 30B are in their nominal positions. In accordance with a preferred embodiment, the plurality of test patterns 105 in the test image print data 100 include test patterns 105 having a plurality of different stitch gaps G positioned at each of the stitch zones (i.e., the overlap regions 34) of the printing module 12. In an exemplary embodiment, test patterns 105 are provided for 30 different stitch gaps ranging from 12 jets down to −2.5 jets in increments of −0.5 jets. Note that the maximum stitch gap, the minimum stitch gap, and the stitch gap increment are all configurable parameters that can be adjusted in various embodiments. Note that for negative stitch gaps, the first test pattern portion 205A will overlap with the second test pattern portion 205B when the first and second jetting modules are in their nominal positions. Test patterns 105 with stitch gaps including a half jet spacing (e.g., 11.5 jets) are provided by printing only 50% of jetting module 30A.

Figure 6:
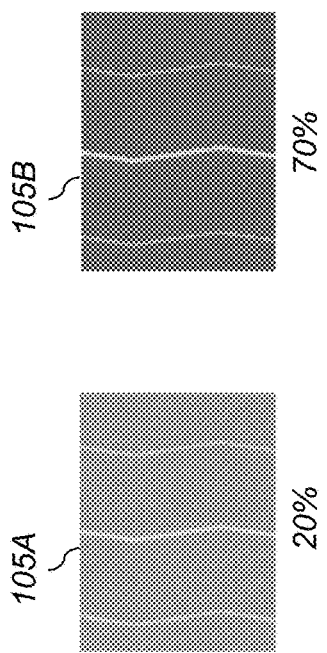
FIG. 6 shows exemplary test patterns having different density levels.

It has been found that the aim stitch gap can vary with image density. To characterize this behavior, a set of test patterns 105 are provided at a plurality of different region density levels (e.g., 20% or 70%). This is illustrated in FIG. 6 which shows a test pattern 105A having a 20% region density level, and a test pattern 105B having a 70% region density level. This has been found to work well in systems which have a substantially linear relationship between the stitch gap and the density level. In other embodiments, test patterns 105 can be provided at different density levels (e.g., 25% and 65%), or at more than two density levels. A set of test patterns 105 is generally printed using each of the printing modules 12 (e.g., for each of the different color channels). In an exemplary embodiment, for the case where there are 30 stitch gaps, 2 region density levels and 4 color channels (e.g., CMYK), a total of 30×2×4=240 test patterns 105 are printed at each stitch zone. In some cases, it may be necessary to print the test patterns 105 over a plurality of different documents.

Figure 7:
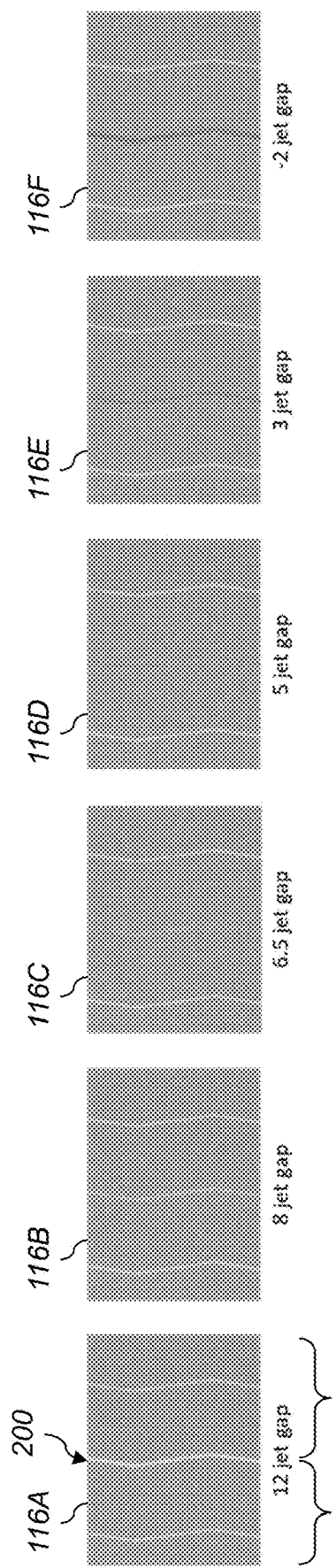
FIG. 7 shows exemplary test patterns having a range of stitch gaps.

FIG. 7 shows exemplary printed test patterns 116A-116F corresponding to a subset of the stitch gaps corresponding to the test pattern 105 of FIG. 5. Qualitatively, it can be seen that for large stitch gaps (e.g., the 12 jet gap) there is a visible light boundary between the test pattern portions 205A, 205B, whereas for the smaller stitch gaps (e.g., the −2 jet gap) there is a visible dark boundary. Somewhere in between (at about a 5 jet gap in this case) the boundary is essentially undetectable. This would be the stitch gap where the two jetting modules 30A, 30B have an appropriate cross-track alignment. In accordance with the present invention, an automatic method is used to determine the aim stitch gap that minimizes the visibility of the stitching boundary 200.

Returning to a discussion of FIG. 4, a digitize printed test image step 120 is used to digitize the printed test image 115 to produce a digitized test image 125. In an exemplary embodiment, the digitize printed test image step 120 uses an imaging system 20 integrated into the printing system 10 (FIG. 1). As discussed earlier, the imaging system 20 can use one or more digital cameras or scanners as is well-known in the art to digitize the printed test image 115. The digitized test image 125 will include digitized versions of each of the printed test patterns 116.

An analyze digitized test image step 130 is used to automatically analyze the digitized test image 125 to determine an aim stitch gap 135. Qualitatively, the analyze digitized test image step 130 analyzes the digitized test patterns to determine the stitch gap which minimizes the visibility of the stitching boundary 200 (FIG. 7).

Figure 8:
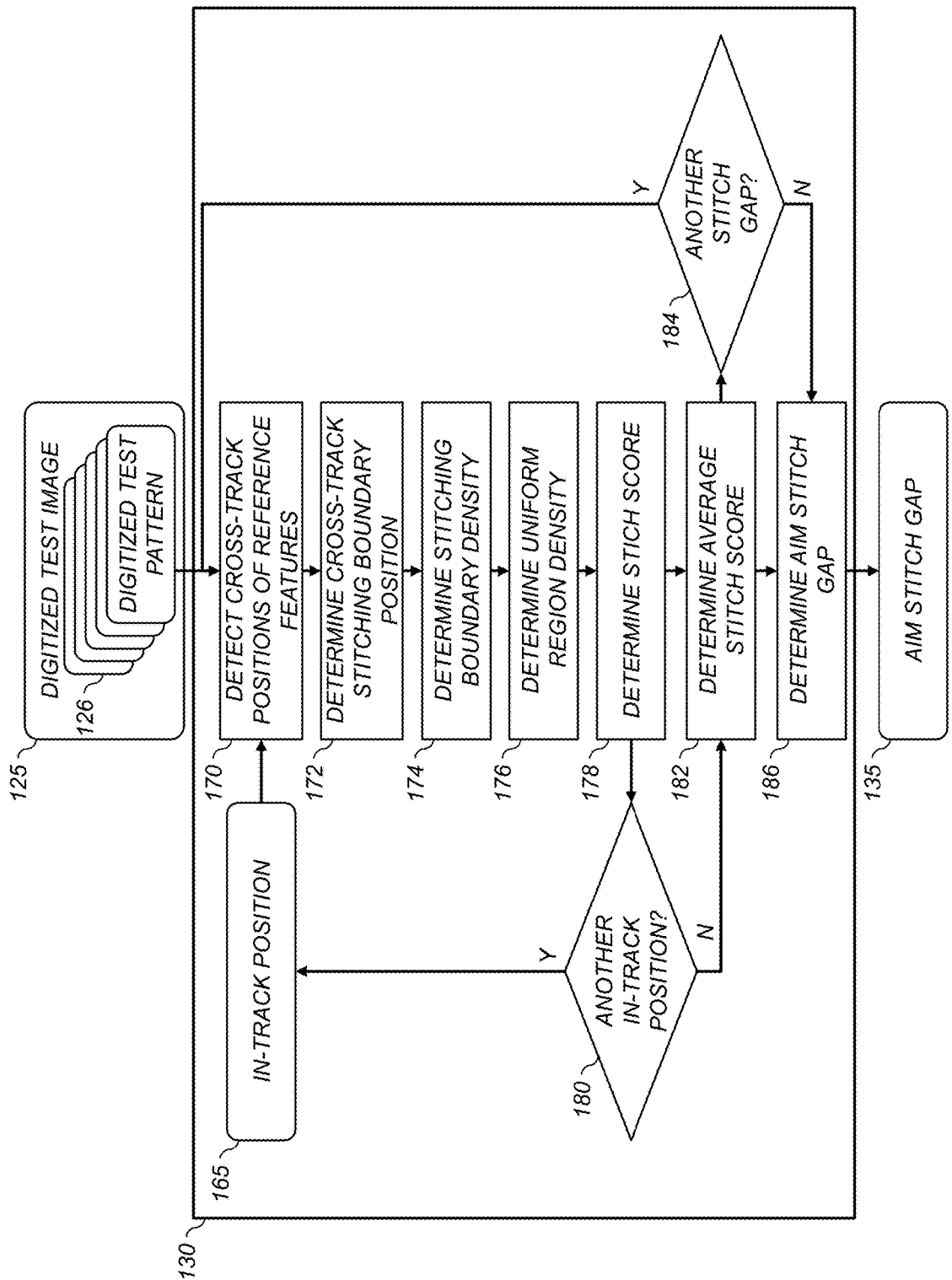
FIG. 8 is a flow-chart of a method for determining an aim stitch gap in accordance with an exemplary embodiment.

Additional details of the analyze digitized test image step 130 in accordance with an exemplary embodiment are shown in the flow chart of FIG. 8. At a high level, the analyze digitized test image step 130 analyzes the digitized test patterns 126 corresponding to each of the stitch gaps to determine stitch scores, and then analyzes the stitch scores to determine the aim stitch gap 135 for a particular region density level, stitch zone and color channel. This process can then be repeated for each region density level, stitch zone and color channel.

Figure 9:
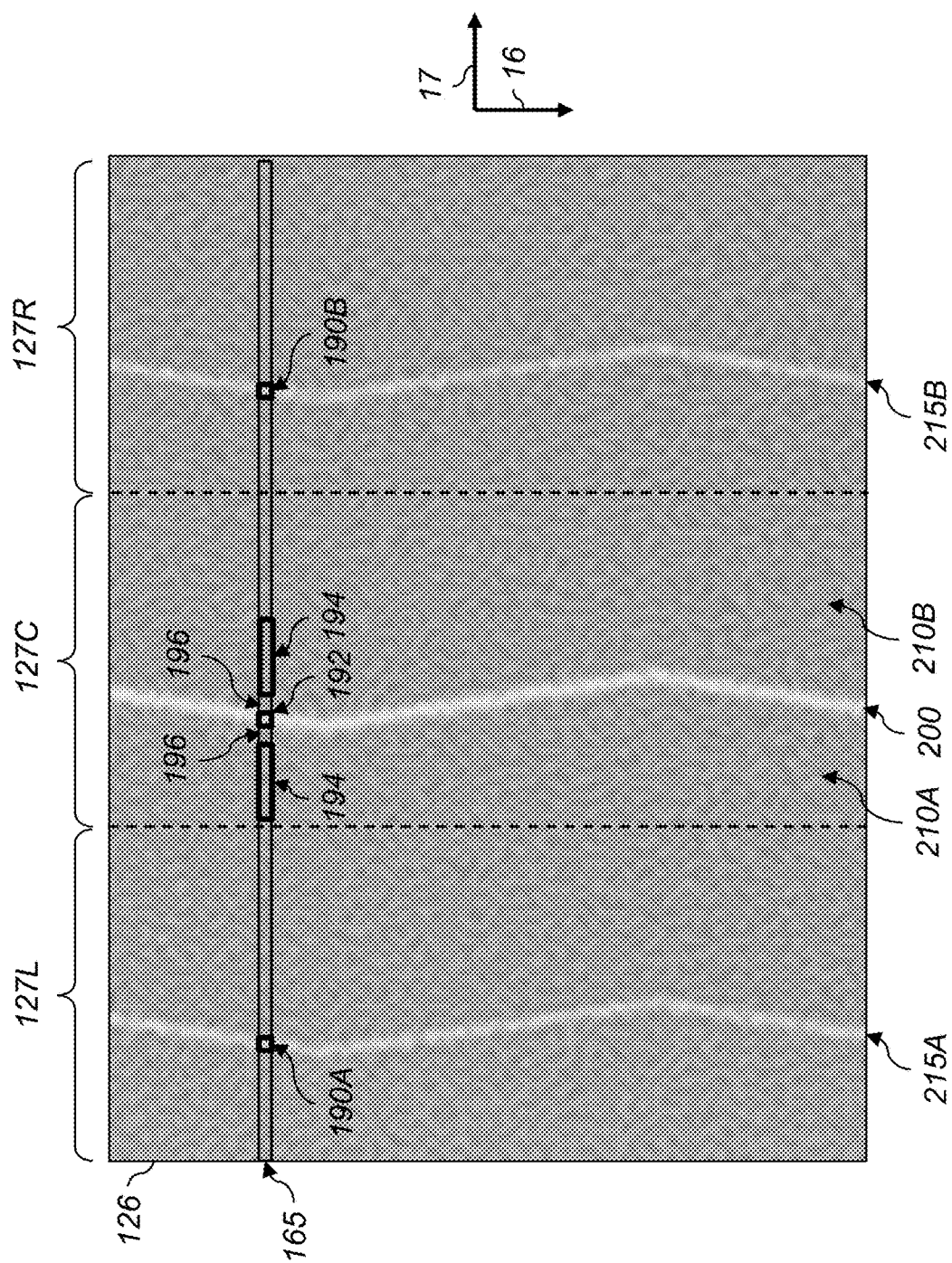
FIG. 9 illustrates the regions of the digitized test pattern that are analyzed to determine a stitch score.

For a particular in-track position 165, a detect cross-track positions of reference features step 170 is used to analyze a line of the digitized test pattern 126 to detect cross-track reference mark positions 190A, 190B of the first and second reference features 215A, 215B as illustrated in FIG. 9. In an exemplary embodiment, this analysis is performed by dividing the digitized test pattern 126 into three equal parts, a left third 127L, a center third 127C and a right third 127R. The left and right thirds 127L, 127R are analyzed in blocks of pixels (e.g., 12 pixels high×4 pixels wide). The mean code values in all blocks in the right and left thirds 127L, 127R are determined. The mean and standard deviation of the block means in each third are then determined. Reference blocks are then determined by finding blocks that differ from the mean of all blocks in that third by more than 3 standard deviations. The reference blocks closest to the center are designated to be the cross-track reference mark positions 190A, 190B corresponding to the first and second reference features 215A, 215B.

A determine cross-track stitching boundary position step 172 (FIG. 8) is used to determine a cross-track stitching boundary position 192 (FIG. 9). In a preferred configuration, the cross-track stitching boundary position 192 is at a position midway between the cross-track reference mark positions 190A, 190B.

A determine stitching boundary density step 174 (FIG. 8) is used to determine a stitching boundary density $D_B$ at the cross-track stitching boundary position 192 (FIG. 9). In a preferred embodiment, the stitching boundary density is found by computing the average value in a block of pixels (e.g., 12 pixels high×6 pixels wide) centered at the cross-track stitching boundary position 192.

Next, a determine uniform region density step 176 (FIG. 8) is used to determine a uniform region density $D_U$ that can be compared to the stitching boundary density $D_B$. In an exemplary configuration, the uniform region density is determined by computing the average pixel value in uniform density regions 194 (FIG. 9) of a specified size (e.g., 12 pixels wide×50 pixels wide) located on either side of the cross-track stitching boundary position 192. Preferably, the uniform density regions 194 are separated from the cross-track stitching boundary position 192 by a buffer zone 196 of a specified size (e.g., 20 pixels wide).

A determine stitch score step 178 (FIG. 8) is then used to determine a stitch score $S_y$ at that in-track position 165 representing a difference between the determined stitching boundary density $D_B$ and the determined uniform region density $D_U$. In an exemplary embodiment, the stitch score is calculated as $S_y = D_B - D_U$. When the stitching boundary 200 (FIG. 9) is lighter (higher code values) than the uniform density region 210A, 210B corresponding to a larger than optimal stitch gap, the stitch score $S_y$ will be positive. When the stitching boundary 200 (FIG. 9) is darker (lower code values) than the uniform density region 210A, 210B corresponding to a smaller than optimal stitch gap, the stitch score $S_y$ will be negative.

An in-track position test 180 (FIG. 8) is used to determine whether there are additional in-track positions 165 in the current digitized test pattern 126 to be processed. If so, the in-track position 165 is incremented and steps 170, 172, 174, 176 and 178 are repeated to determine a corresponding stitch score. In an exemplary embodiment, stitch scores are determined for each row of pixel blocks in the digitized test pattern 126. In other embodiments stitch scores can be determined at a predefined set of in-track positions 165 (e.g., separated by a predefined increment) Once the stitch scores have been determined for all of the in-track positions 165, a determine average stitch score step 182 is used to determine an average stitch score $S_G$ corresponding to the stitch gap associated with the digitized test pattern 126. The average stitch score is determined by calculating the average of the stitch scores $S_y$ for each of the in-track positions ($S_G$=average ($S_y$)).

A stitch gap test 184 (FIG. 8) is then used to determine whether there are more digitized test patterns 126 for additional stitch gaps to be processed. If so, the above-described steps are repeated to determine corresponding average stitch scores $S_G$ for each stitch gap G.

Figure 10:
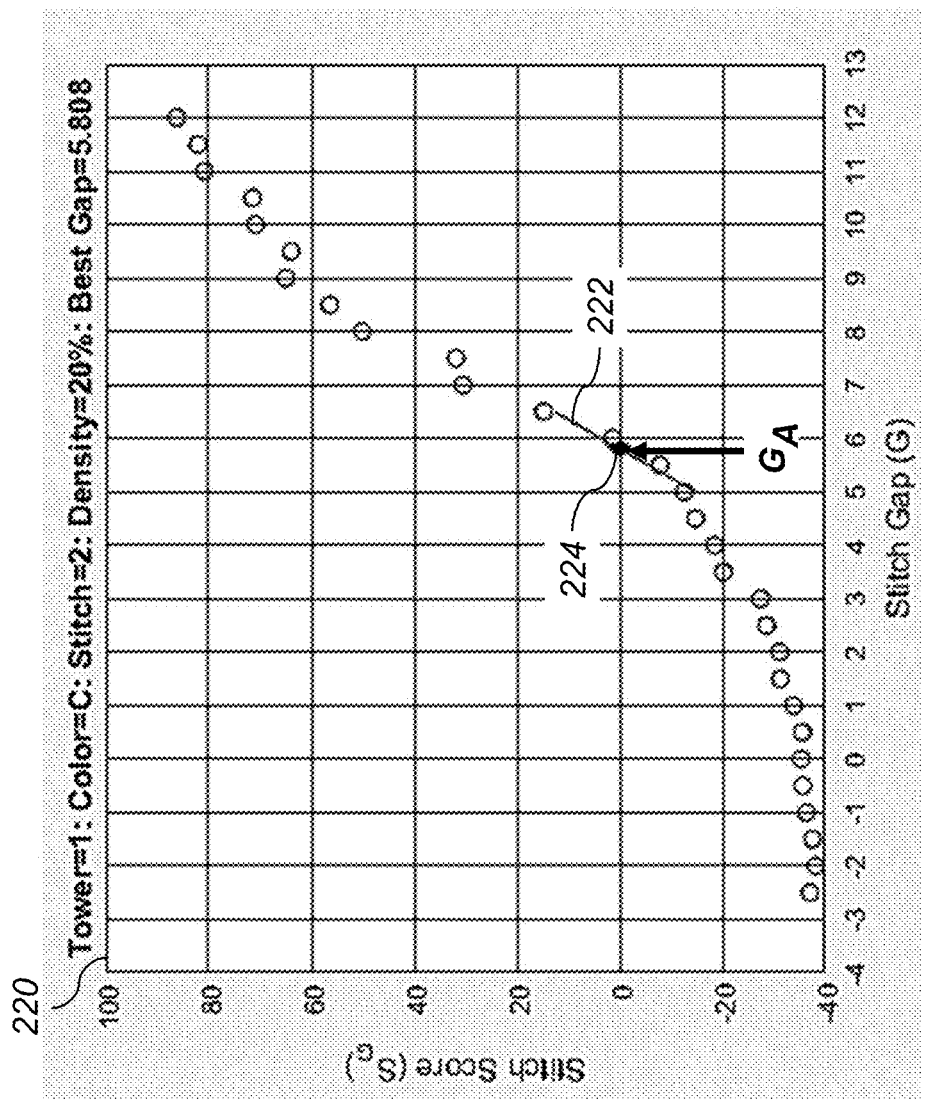
FIG. 10 is an exemplary graph showing stitch score determined as a function of stitch gap.

After all of the average stitch scores have been determined, a determine aim stitch gap step 186 (FIG. 8) is used to determine the aim stitch gap 135. The aim stitch gap 135 will be the stitch gap where the stitching boundary density $D_B$ matches the uniform region density $D_U$. In an exemplary embodiment, a graph 220 of the determined average stitch scores $S_G$ as a function of the stitch gap G is formed as shown in FIG. 10. A line 222 is then fit to the four points closest to $S_G$=0. A zero crossing 224 for the line 222 is then determined from the equation of the line 222. The stitch gap corresponding to the zero crossing 224 is then defined to be the aim stitch gap 135 (GA). This corresponds to the stitch gap where the magnitude of the average stitch score is minimized. In other embodiments, rather than fitting a linear function to the near zero points, some other mathematical function such as a polynomial or a spline can be fit to some or all of the datapoints and evaluated to determine the zero crossing 224 and the corresponding aim stitch gap 135. In other embodiments, the measured stitch gap having the minimum average stitch score magnitude is designated to be the aim stitch gap 135.

Figure 11A:
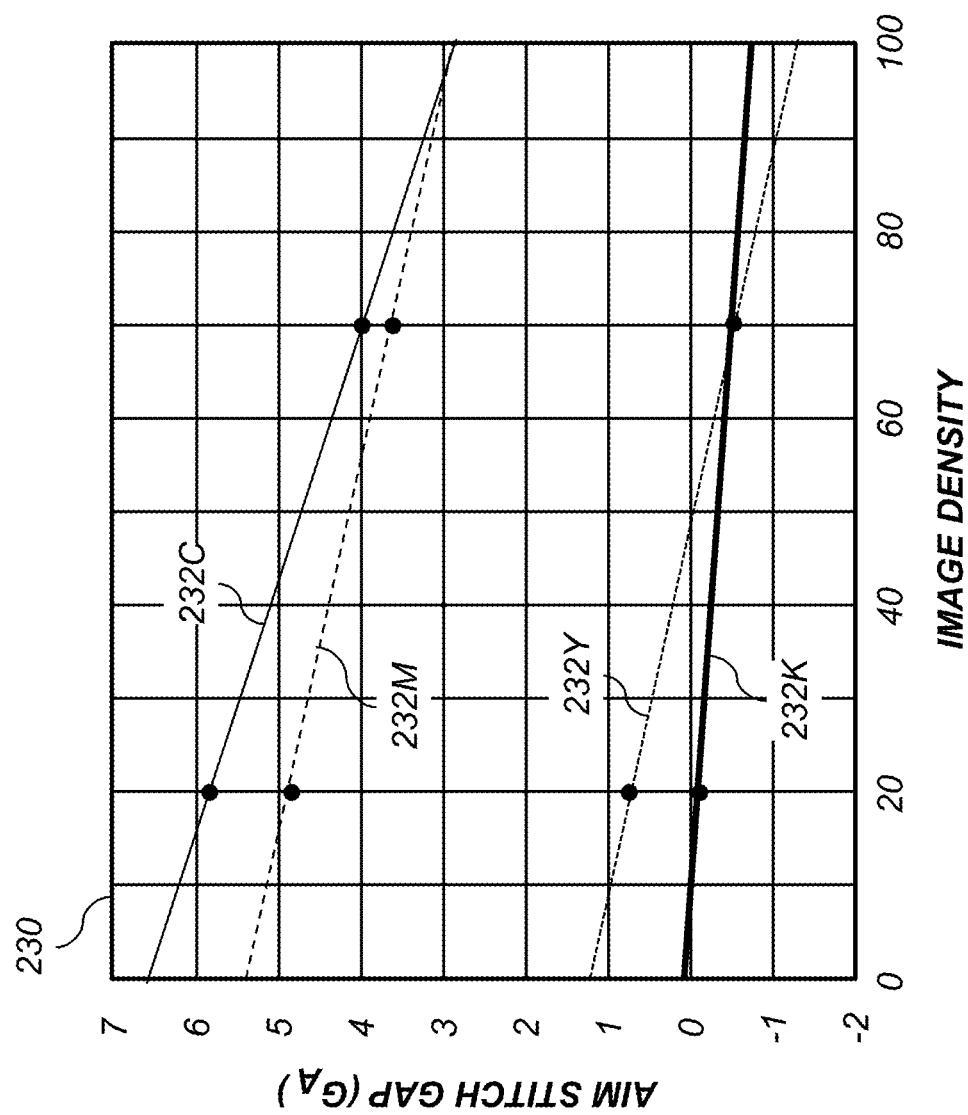
FIG. 11A is an exemplary graph showing the aim stitch score as a function of image density for each color channel.

It has been observed that the best stitch gap changes with image density in an approximately linear relationship. Therefore, a stitch gap function relating aim stitch gap 135 to the image density can be determined by repeating the method described relative to FIG. 8 using test patterns 105 (FIG. 5) having uniform density regions 210A, 210B with two different density values. In an exemplary embodiment, test patterns 105 are created having 20% and 70% density values. FIG. 11A illustrates a graph 230 showing stitch gap functions 232C, 232M, 232Y, 232K for cyan, magenta, yellow and black color channels, respectively, which are determined by fitting a linear function between the measured aim stitch gap values. In each case, it can be seen that the aim stitch gap decreases with increasing density. This occurs because as the density increases, the edge drops get pulled toward the center of the jetting module 30. Similar functions can be determined for each of the stitch zones (i.e., overlap regions 34) in the printing modules 12 (FIG. 2). In other embodiments, a stitch gap function relating the aim stitch gap 135 to the image density can be determined by repeating the method described relative to FIG. 8 using test patterns 105 (FIG. 5) having uniform density regions 210A, 210B with more than two different density values. In other embodiments, some other mathematical function such as a polynomial or a spline can be fit to some or all of the measured aim stitch gap datapoints and evaluated to determine the aim stitch gap 135 for all image density levels.

Returning to a discussion of FIG. 4, once the aim stitch gaps 135 are determined, a determine stitching error correction values step 140 is used to determine corresponding stitching error correction values 145. The stitching error correction values 145 are a set of parameters that can be used to instruct the printer how to configure the printing process in order to compensate for the cross-track stitching errors. In some embodiments, the stitching error correction values 145 are used to correct the cross-track stitching errors using a method similar to that described in commonly-assigned U.S. Pat. No. 8,393,709 to Enge, entitled "Printing method for reducing stitch error between overlapping jetting modules," which is incorporated herein by reference.

In an exemplary embodiment, the stitching error correction values 145 include parameters defining which physical jets are used to print the image data (which can be characterized by specifying a physical stitch gap), and other parameters which specify a density-dependent amount of fill to be provided using jets adjacent to the boundary. The adjacent jets used to fill the remaining stitch gap are known as "masking jets." Due to system limitations, it is generally necessary to use the same physical stitch gap for all density levels. In a preferred configuration, a physical stitch gap is selected which is an integer value rounded up from the largest aim stitch gap in the stitch gap function for a particular color channel. For example, consider the graph 230 of FIG. 11A. From the cyan stitch gap function 232C, a physical stitch gap of 7 jets would be chosen for the cyan color channel, with some additional density-dependent fill being provided using jets adjacent to the boundary responsive to the difference between the selected physical stitch gap and the aim stitch gap at a particular density level. Similarly, a physical stitch gap of 6 jets would be selected for magenta given the magenta stitch gap function 232M, a physical stitch gap of 2 jets would be selected for yellow given the yellow stitch gap function 232Y, and a physical stitch gap of 1 jet would be selected for black given the black stitch gap function 232K. The required amount of fill as a function of density can then be determined by subtracting the aim stitch gaps from the corresponding physical stitch gap to provide cyan fill function 234C, magenta fill function 234M, yellow fill function 234Y and black fill function 234K as illustrated in graph 233 of FIG. 11B.

Figure 12A:
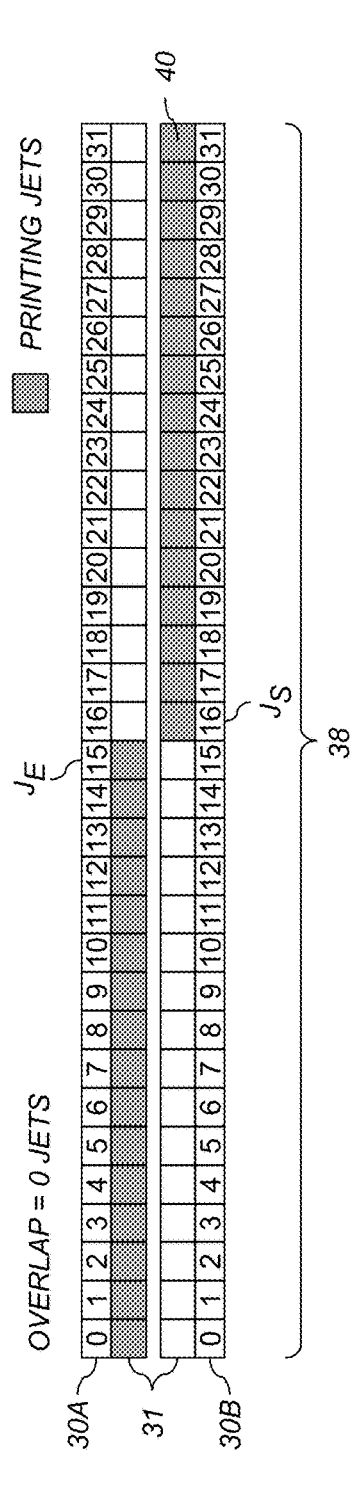
FIG. 12A illustrates the geometry of the overlap region for perfectly-aligned jetting modules.

The following example illustrates how printing can be controlled to compensate for cross-track stitch errors given a stitch gap function. FIG. 12A illustrates the case where two jetting modules 30A, 30B with 32 stitch jets 38 are perfectly aligned. In this case, perfect printing could be achieved by designating a set of non-overlapping printing jets 40. In this case jet #15 of the first jetting module 30A is designated as an "end jet" $J_E$ and jet #16 of the second jetting module 30B is designated as a "start jet" $J_S$ to provide a physical stitch gap of 0 jets. (In general, the physical stitch gap will be given by $J_S-J_E-1$.)

Figure 12B:
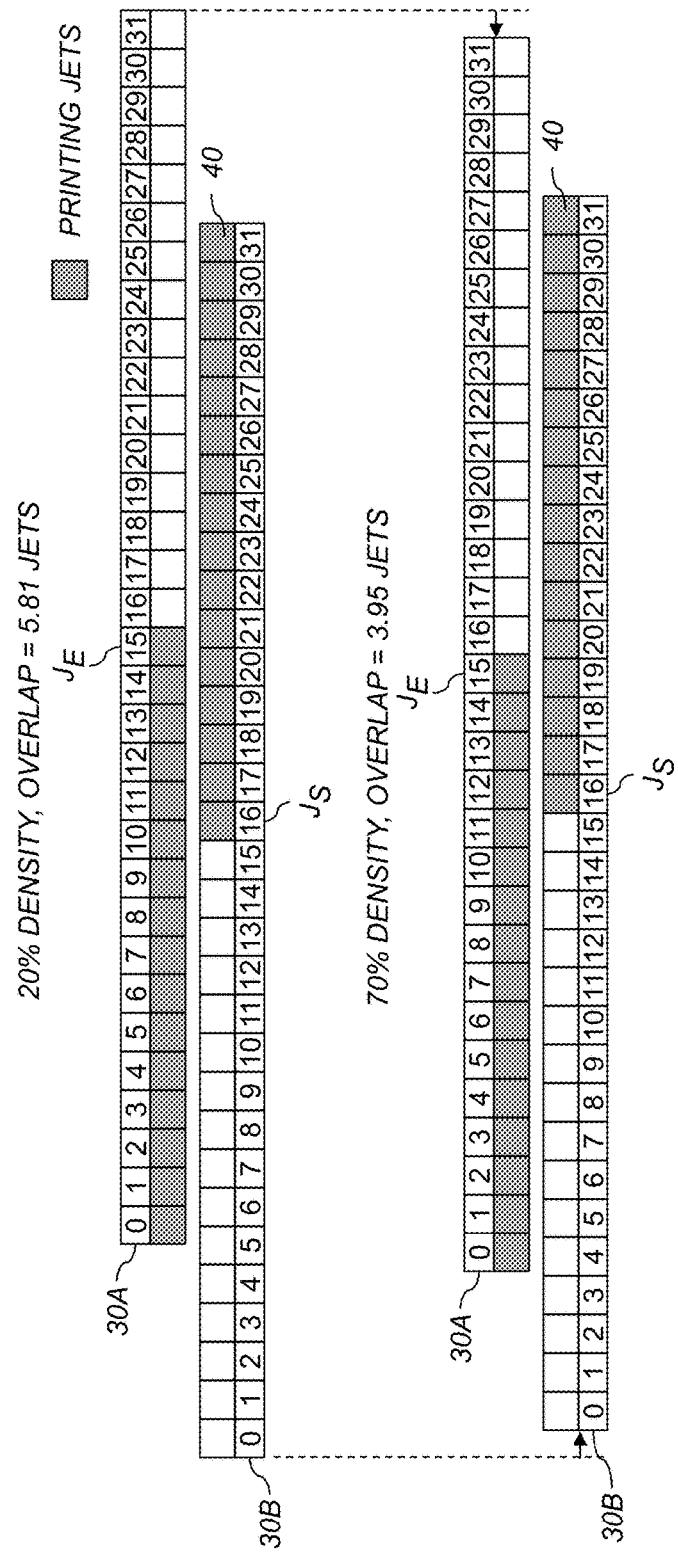
FIG. 12B illustrates the geometry of the overlap region for misaligned jetting modules.

Unfortunately, the condition shown in FIG. 12A rarely happens. In general, the jetting modules 30A, 30B will not be perfectly aligned, and additionally, as discussed earlier, the apparent stitch gap has been found to vary with density. FIG. 12B illustrates a typical scenario where there is a physical misalignment between the jetting modules and where the apparent misalignment varies with density. In this case, there are approximately 5.5 jets of overlap at a 20% density level and approximately 4.0 jets of overlap at a 70% density level. (This is similar to the cyan color channel in FIG. 11A.) Note that while the physical positions of the jetting modules 30A, 30B hasn't change, the redirection of the ink drops at higher densities makes it appear as though jetting module 30A has moved to the left and jetting module 30B has moved to the right at the higher density. If no cross-track alignment correction were applied (i.e., a stitch gap of 0 was assumed), we would see a dark line in the stitch zone where the printing jets 40 overlap on both the 20% and 70% targets.

Figure 12C:
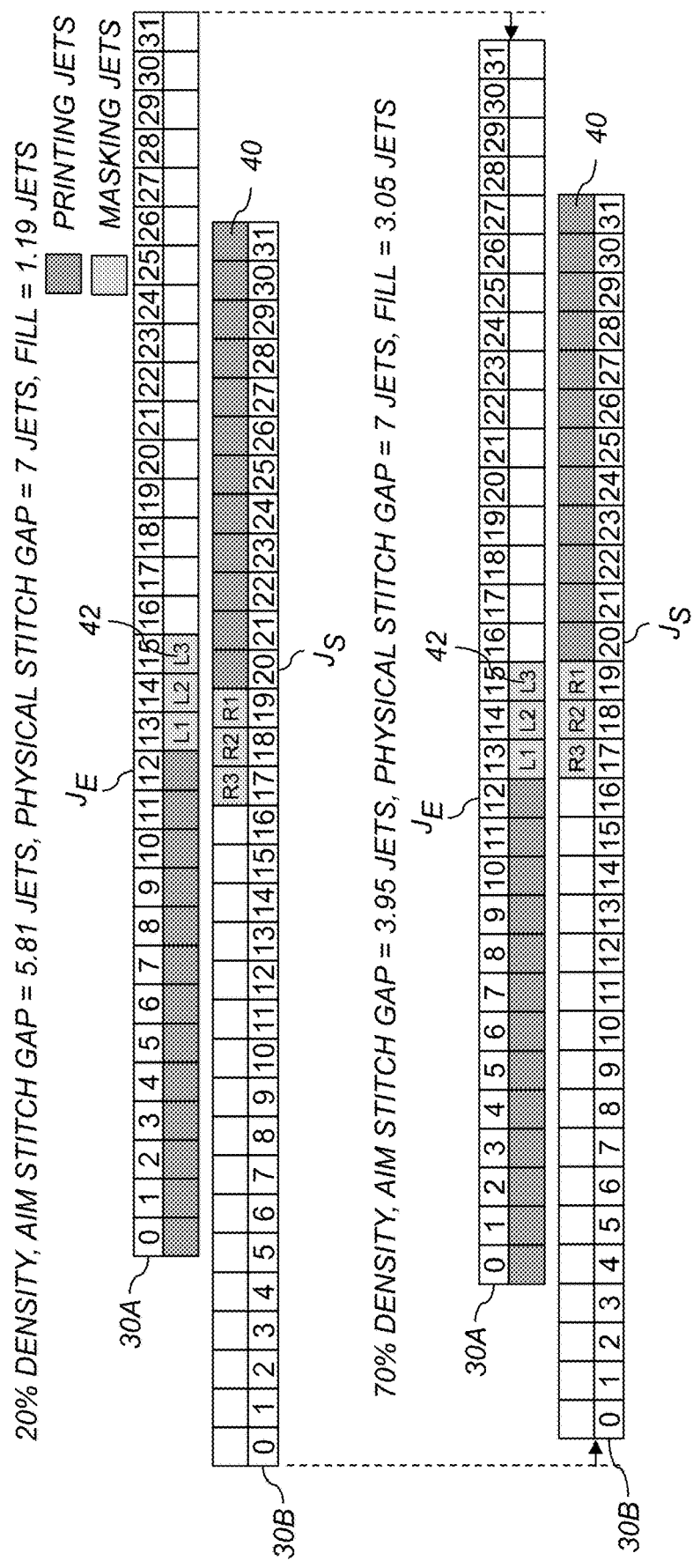
FIG. 12C illustrates the geometry of the overlap region when the present invention is used to compensate of the alignment errors of FIG. 12B.

FIG. 12C illustrates how the cross-track alignment errors can be corrected in accordance with the present invention. As discussed earlier, it is necessary to use the same physical stitch gap for all density levels, and for the cyan color channel of FIG. 11A a physical stitch gap of 7 jets is preferably selected. This can be used to select corresponding values for the start jet and the end jet of the printing jets 40. In this example the start jet is set to $J_S=20$ and the end jet is set to $J_E=12$ to provide the physical stitch gap of $20-12-1=7$ jets. In an exemplary configuration the start and end jets are chosen to center the physical stitch gap in the stitch jets 38 of the overlap region 32 (FIG. 3) so that each of the jetting modules 30A, 30B has approximately the same number of printing jets. If the physical stitch gap is an odd number, then one of the jetting modules (e.g., the left jetting module 30A) will have an extra printing jet. To fill the remaining gap, masking jets 42 are used that are adjacent to the printing jets. In an exemplary configuration, up to three masking jets can be used on each of the jetting modules 30A, 30B to fill the residual gap, designated as L1, L2, L3 and R1, R2, R3, respectively.

To determine the data to be printed by the masking jets 42 it is necessary to estimate the local density level from the binary data being printed. In an exemplary configuration, the number of pixels to be printed in a pixel neighborhood around the boundary pixels are counted and quantized to 11 density levels (i.e., 0%, 10%, 20%, . . . , 100%). For example, a 2×20 pixel neighborhood can be used including the columns to the left and right of the stitch point, and 10 rows of image data including the current row and the next 19 rows to be printed. The resulting count will be an integer in the range 0-40. The count can then be quantized to one of the density levels according to the following table.

| Pixel Count | Density Level |
| --- | --- |
| 0 to 1 | 0 (0%) |
| 2 to 5 | 1 (10%) |
| 6 to 9 | 2 (20%) |
| 10 to 13 | 3 (30%) |
| 14 to 17 | 4 (40%) |
| 18 to 21 | 5 (50%) |
| 22 to 25 | 6 (60%) |
| 26 to 29 | 7 (70%) |
| 30 to 33 | 8 (80%) |
| 34 to 37 | 9 (90%) |
| 38 to 40 | 10 (100%) |

In an exemplary configuration, 16 different fill levels are provided at each density level. The different fill levels at each density can be referred to by corresponding "mask numbers." The fill levels are selected to span the range of fill levels that are expected to be encountered at a given density level. Generally, a larger range of fill levels will be required at larger density levels. FIG. 13 shows a table 240 of fill levels as a function of density and mask number that are defined for use in an exemplary configuration. One skilled in the art will recognize that different numbers of densities and masks, and different ranges of fill levels can be used in other embodiments.

Figure 11B:
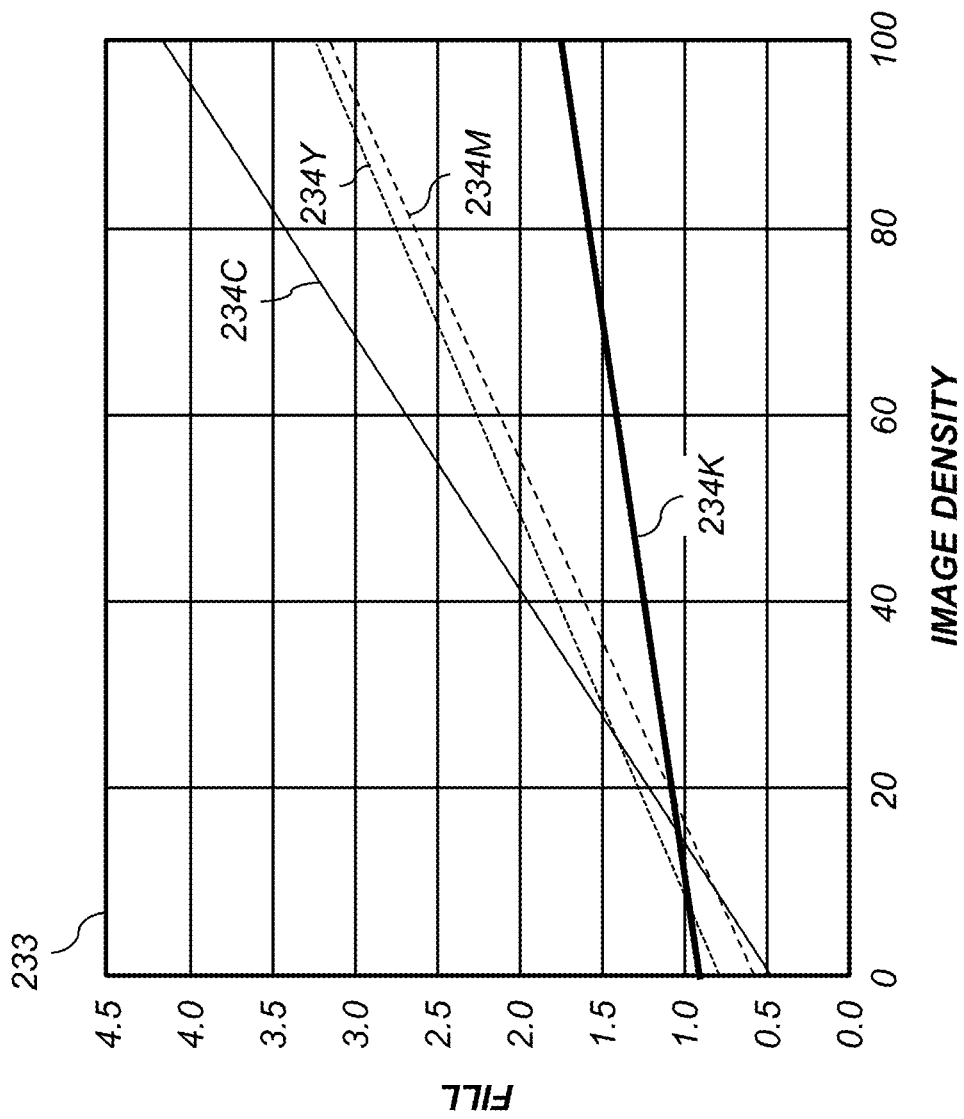
FIG. 11B is an exemplary graph showing the fill level as a function of image density corresponding to FIG. 11A.

In the example shown in FIGS. 11A-11B and 12C the fill level required at 20% is 1.19 jets. The nearest mask number in the table 240 of FIG. 13 would be mask #7 having a fill level of 1.20 jets, which is highlighted in dark gray. Similarly, the fill level required at 70% is 3.05 jets, which would map to mask #9 having a fill level of 3.1 jets, which is highlighted in light gray. Mask numbers for each of the density levels can be selected in a similar fashion. FIG. 14 shows a table 242 with the required fill levels for each color channel and density level corresponding to the sample data in FIG. 11B. Table 244 shows the corresponding mask numbers required to provide the closest fill levels given the values in table 240 of FIG. 13.

Figure 16:
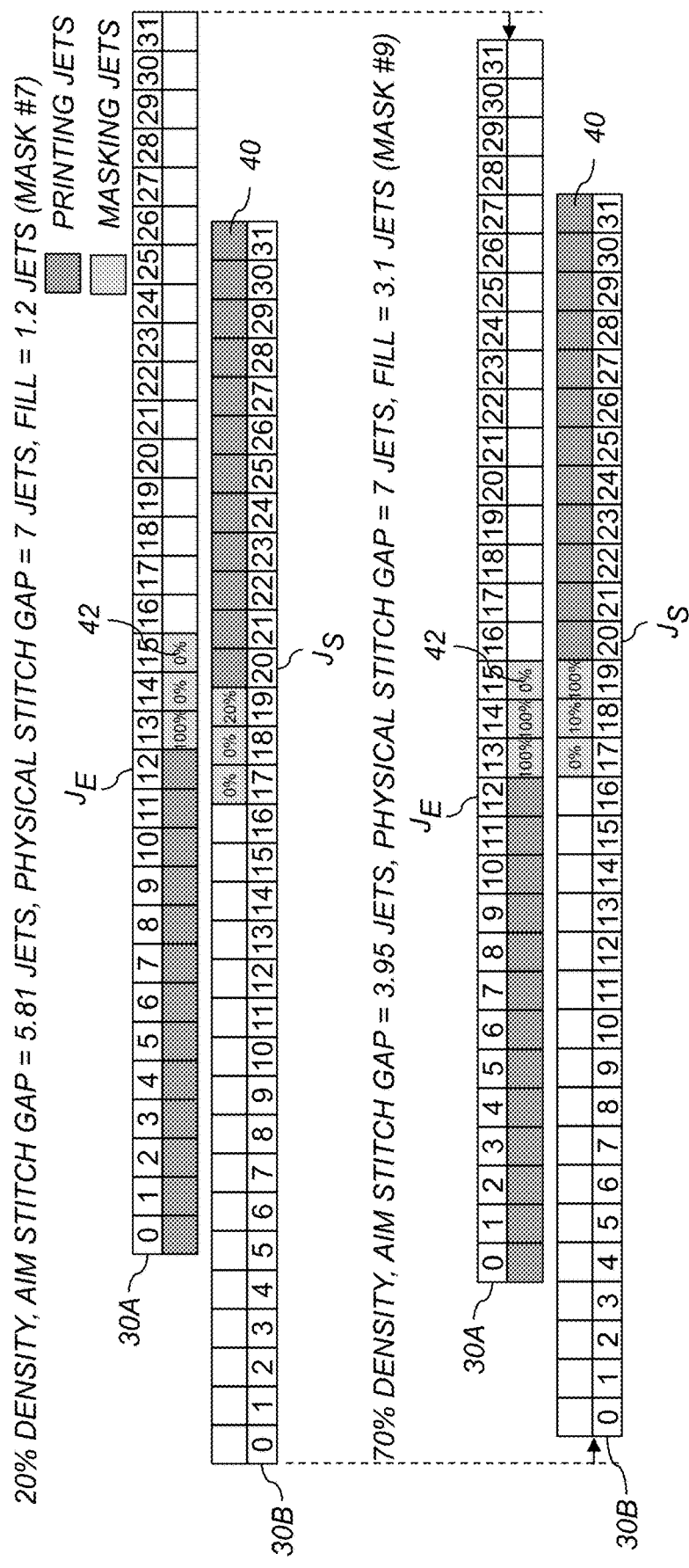
FIG. 16 shows the mask values determined for the masking jets of FIG. 12C.

In an exemplary embodiment, masks that provide each of the fill levels of FIG. 13 are predetermined and stored in mask tables 246 as illustrated in FIGS. 15A-15F. A mask table 246 is provided for each of the masking jets 42 (L1, L2, L3, R1, R2, R3) of FIG. 12C. The mask tables 246 give mask values for the masking percentage corresponding to the percentage of the pixels that should be printed for the associated jet. The shaded table entries correspond to the examples discussed earlier with respect to FIG. 12C and FIG. 13 where mask #7 is used for the 20% density sample and mask #9 is used for the 70% density sample. FIG. 16 shows the corresponding masking percentages to be applied for each of the masking jets 42. The masking percentages corresponding to the mask values indicate the percentage of the time that the image pixel should be printed at each jet location.

Figure 17:
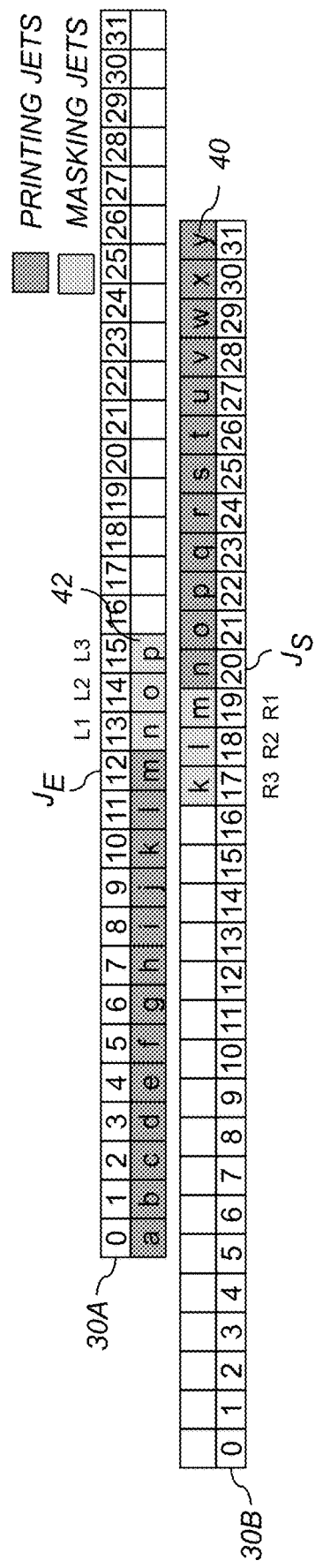
FIG. 17 illustrates how pixel data is assigned to the printing jets and the masking jets.

The mask values are used to mask the pixel values to be printed by the masking jets 42. FIG. 17 illustrates how pixel values to be compared to the mask values are assigned to the masking jets 42. In this example, the incoming pixel values for the row of image data are represented by letters from a to y. For masking jets L1, L2, L3 of the left jetting module 30A, pixel values for the first 3 printing jets of the right jetting module 30B are repeated (n, o and p corresponding to jets #20, #21 and #22). For masking jets R3, R2, R1 of the right jetting module 30B, pixel values for the last 3 printing jets of the left jetting module 30A are repeated (k, l and m corresponding to jets #10, #11 and #12).

A masking algorithm is used to determine which print drops should be printed given the masking percentage. In an exemplary embodiment, the masking algorithm uses a dither matrix to determine which print drops should be printed and which print drops should be deleted at each pixel position. For example, a 1×10 dither matrix can be used having the form [1, 9, 5, 8, 2, 7, 3, 10, 4, 6]. The dither matrix can be addressed by a dither index id which ranges from 0 to 9 in this example. For a given column of image data, the dither index is incremented by 1 for each image pixel containing a "one." When the dither index reaches the size of the dither matrix (10 in this case), the dither index is reset to 0, which has the effect of repeating the dither matrix down the page. For each image row, a dither value is determined by addressing the dither matrix with the dither index, and if the dither value is less than or equal to the mask value determined from the mask tables 246 (FIGS. 15A-15F), then any print drop to be printed at the corresponding location is printed, otherwise it is not printed.

Returning to a discussion of FIG. 4, once the stitching error correction values 145 are determined, they can be used in the printing of customer images. A print image data step 155 is used to print production image data 150 provided for a customer image to produce a corresponding printed image 160. The print image data step 155 applies the stitching error correction values 145 to correct for the cross-track alignment errors in each of the overlap regions 34 (FIG. 2).

Figure 18:
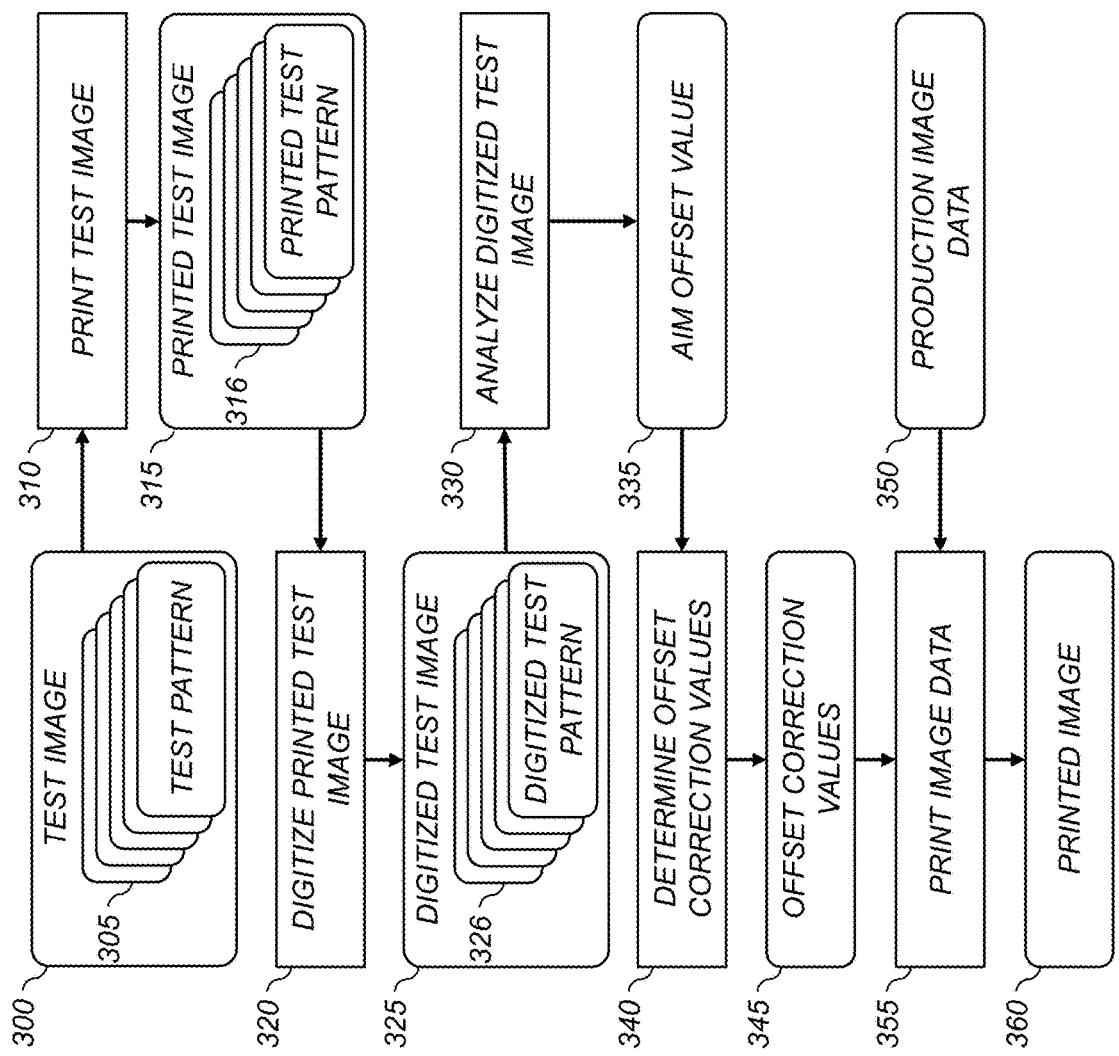
FIG. 18 is a flow-chart of a method for correction of in-track stitching errors in accordance with an exemplary embodiment.

FIG. 18 shows a flow chart for an in-track stitching correction method in accordance with an exemplary embodiment. A print test image step 310 is used to print data for a test image 300 using a printing module 12 (FIG. 1) of a printing system 10 (FIG. 2) to provide a printed test image 315. In an exemplary embodiment, the test image 300 includes a plurality of test patterns 305 for performing in-track stitching correction, and the printed test image 315 includes a corresponding plurality of printed test patterns 316.

Figure 19:
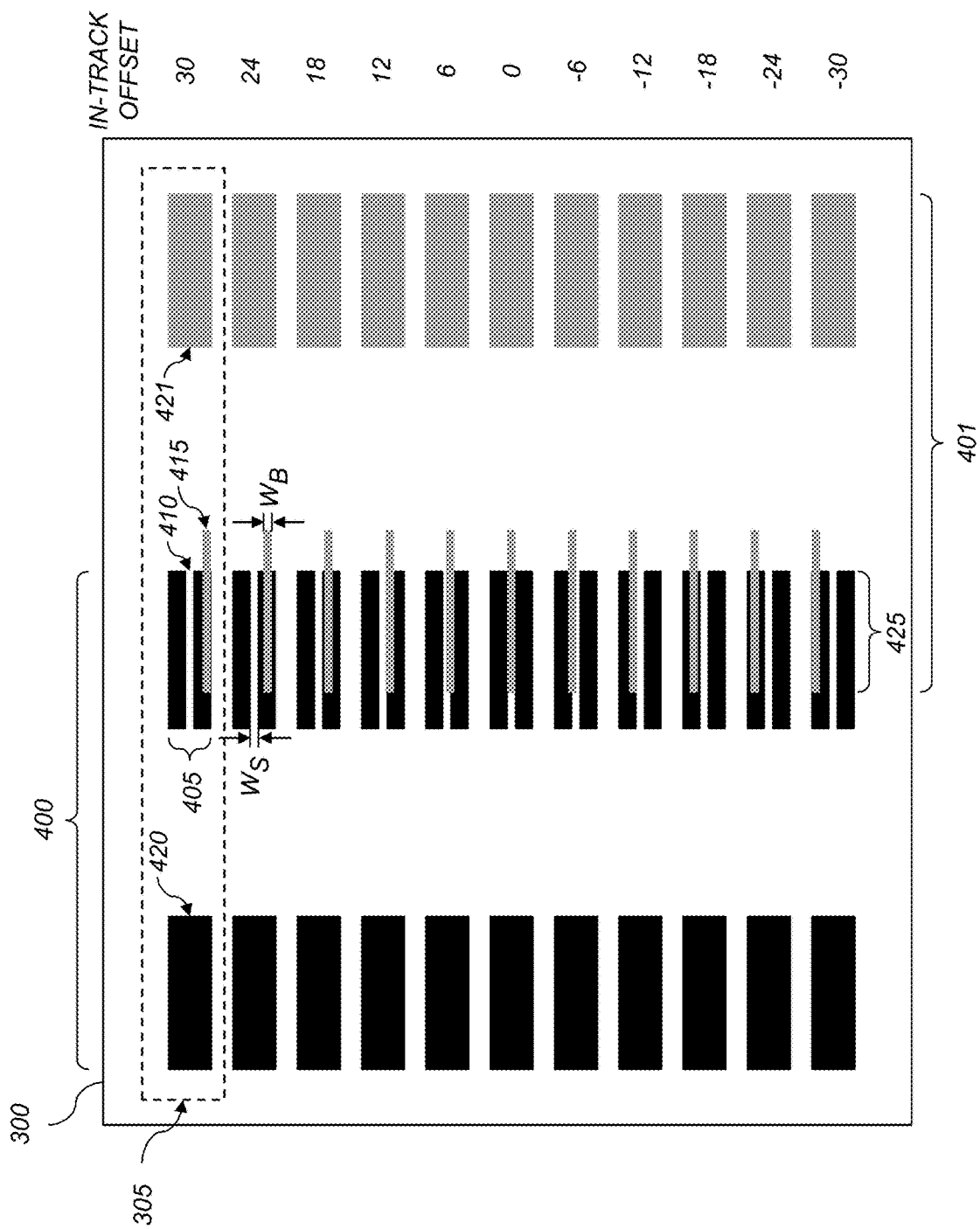
FIG. 19 shows an exemplary test image in accordance with an exemplary embodiment.

FIG. 19 shows a test image 300 including a set of 11 test patterns 305 in accordance with an exemplary embodiment to be printed at the boundary between a pair of adjacent jetting modules 30A, 30B (FIG. 3). Each test pattern 305 includes a first test pattern portion 400 (shown in black) to be printed with a first of the adjacent jetting modules 30A, and a second test pattern portion 401 (shown in gray) to be printed with a second of the adjacent jetting modules 30B. Note that while the first and second test pattern portions 400, 401 are shown with different colors for clarity, they are intended to be printed with the same color ink. Each of the test patterns 305 has an associated in-track offset value. In the illustrated example, the in-track offset values are 30, 24, 18, 12, 6, 0, −6, −12, −18, −24 and −30 tach counts. (Where in an exemplary system there are 3600 tach counts/inch.)

The first test pattern portion 400 includes a uniform density region 405 having a slot 410 extending in the cross-track direction with a slot width $W_S$. The first test pattern portion 400 also includes a first alignment pattern 420 having a defined position relative to the uniform density region 405. The second test pattern portion 401 includes a bar 415 extending in the cross-track direction having with a bar width $W_B$. Preferably, the slot width $W_S$ is substantially equal to the bar width $W_B$. Within the context of the present disclosure the term "substantially equal" can be interpreted to mean equal to within +5%, and more preferably to within +1%. The second test pattern portion 401 also includes a second alignment pattern 421. In the illustrated example, the alignment patterns 420, 421 are uniform rectangular regions, which are nominally aligned with each other in the in-track direction. Note that in other embodiments, the alignment patterns 420, 421 could take other shapes such as circular regions, or reticules (e.g., crossed lines). The uniform density region 405 and the bar 415 overlap in the cross-track direction to provide an overlapping portion 425. The uniform density region 405 and the bar 415 are positioned so that they are printed with stitch jets 38 in the overlap region 34 (FIG. 3). For the case where the adjacent jetting modules 30A, 30B are perfectly aligned, the bar 415 for the test pattern 305 with an in-track offset value of 0 will be perfectly centered within the corresponding slot 410. In the other test patterns 305, the bars 415 are nominally offset from the corresponding slots 410 according to the corresponding in-track offset.

Figure 20:
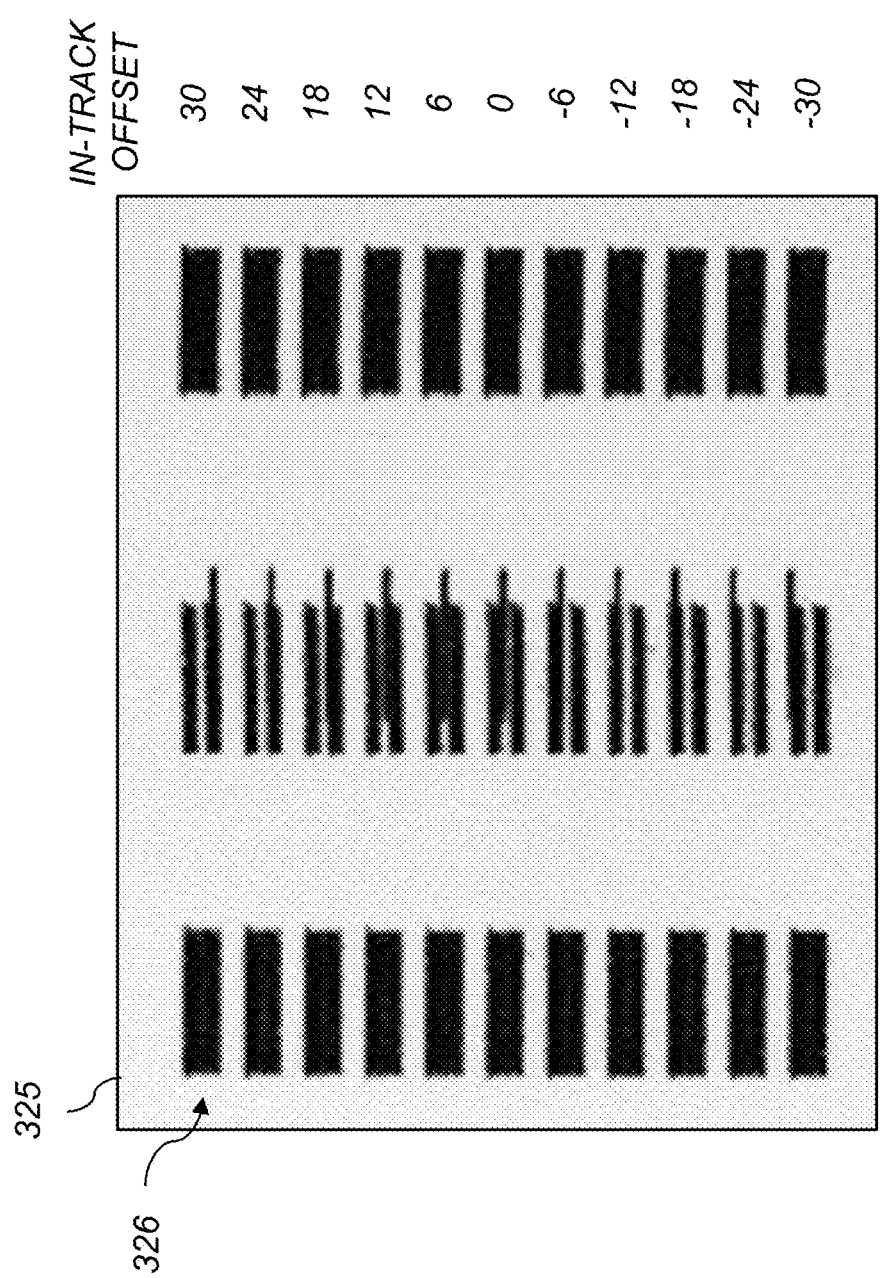
FIG. 20 illustrates a digitized test image corresponding to the test image of FIG. 19.

Returning to a discussion of FIG. 18, a digitize printed test image step 320 is used to digitize the printed test image 315 to provide a corresponding digitized test image 325. In an exemplary embodiment, the digitize printed test image step 320 uses an imaging system 20 integrated into the printing system 10 (FIG. 1). As discussed earlier, the imaging system 20 can use one or more digital cameras or scanners as is well-known in the art to digitize the printed test image 315. The digitized test image 325 will include digitized test patterns 326 corresponding to each of the printed test patterns 316 as illustrated in FIG. 20.

Figure 21:
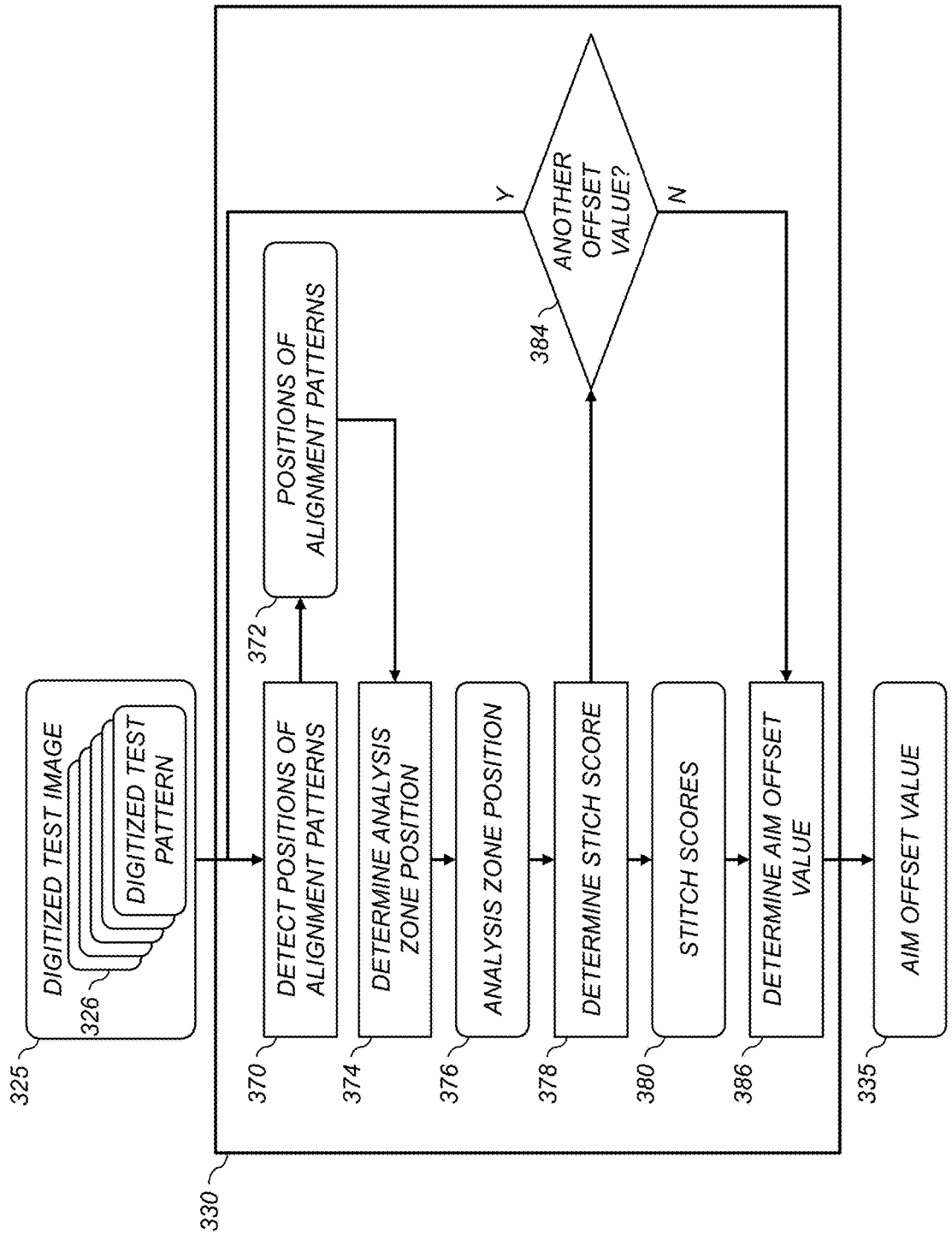
FIG. 21 is a flow-chart of a method for determining an aim offset value in accordance with an exemplary embodiment.

An analyze digitized test image step 330 is then used to automatically analyze the digitized test image 325 to determine an aim offset value 335. FIG. 21 shows a flowchart showing additional details of the analyze digitized test image step 330 according to an exemplary embodiment. A detect position of alignment patterns step 370 is used to determine positions of alignment patterns 372.

Figure 22:
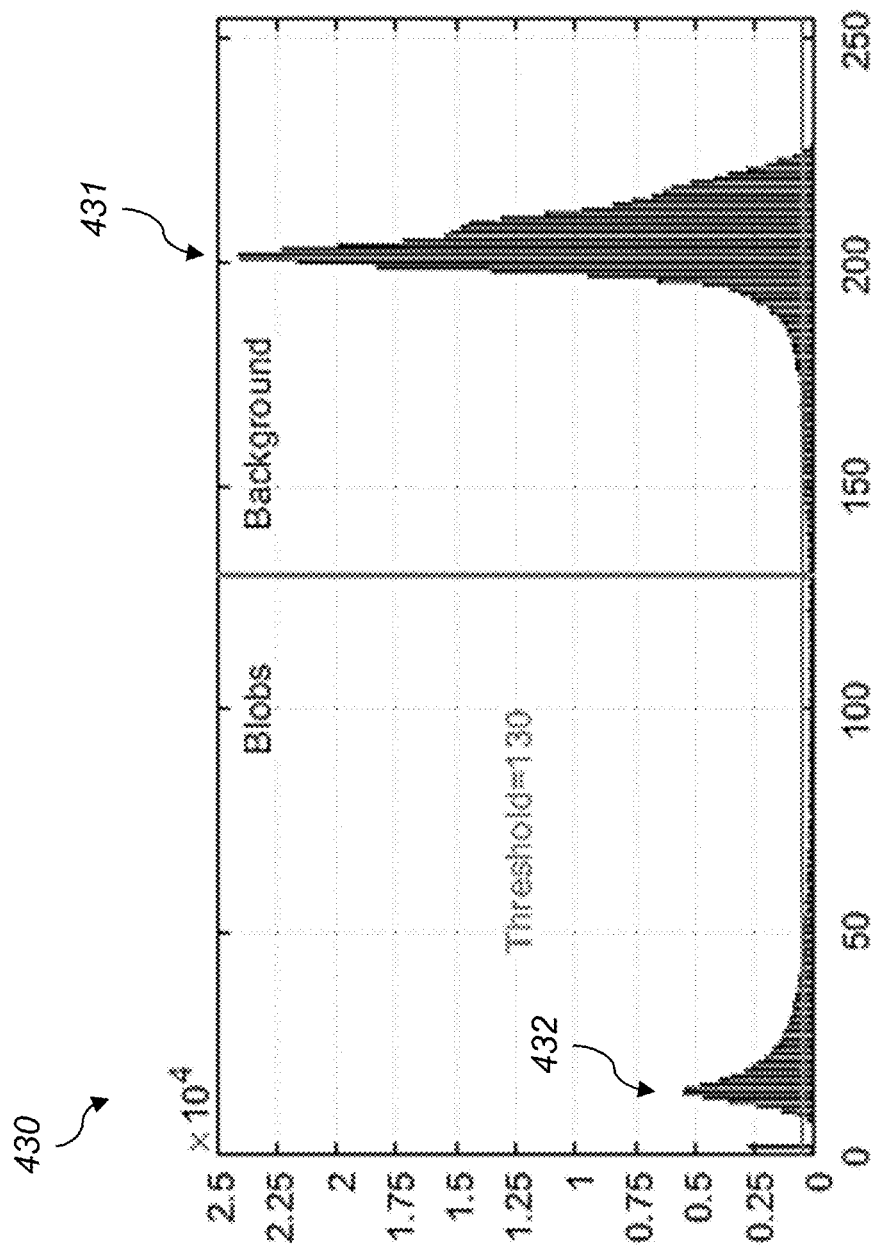
FIG. 22 shows an exemplary histogram determined for the digitized test image of FIG. 20.
Figure 23:
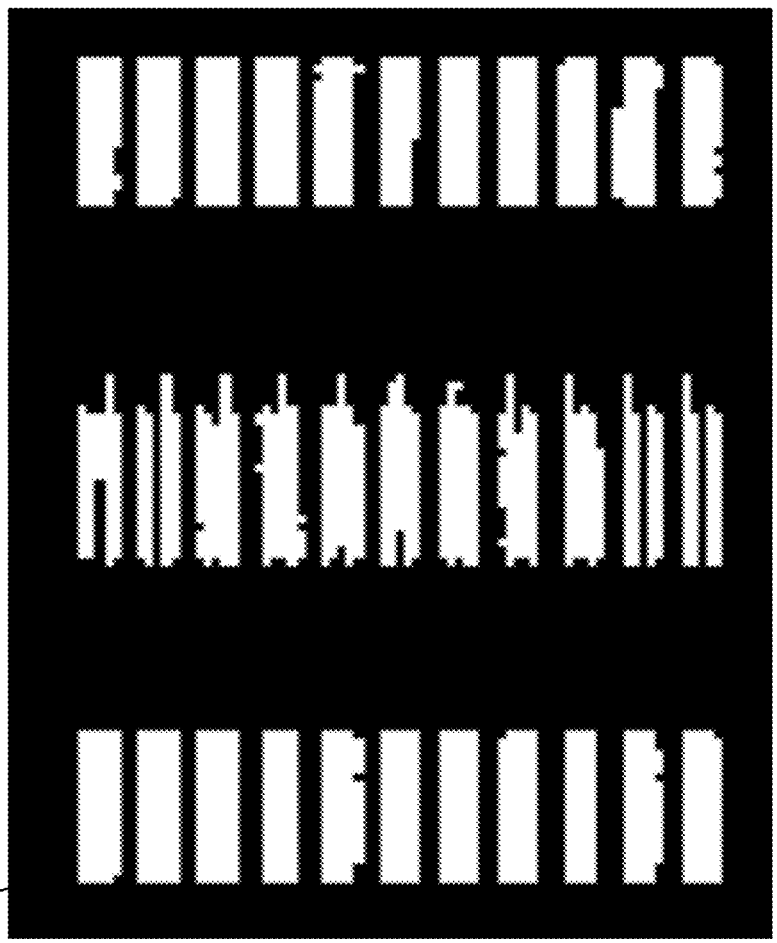
FIG. 23 illustrates an exemplary binary image 433 corresponding to the digitized test image of FIG. 20.

The analyze digitized test image step 330 will generally perform a series of image processing operations to determine the positions of alignment patterns 372. In an exemplary configuration, a histogram 430 of the image data in the digitized test image 325 is determined as illustrated in FIG. 22. The histogram will include one peak 431 corresponding to the light background, and a second peak 432 corresponding to the "blobs" (i.e., the various printed features of the test pattern 305). A threshold value is then determined that is approximately ¾ of the way between the two peaks 431, 432, biased towards the higher code values. In this example, a threshold of T=130 is selected. In other embodiments, a threshold may be chosen at different points between the two peaks in the histogram. A binary image 433 is then determined by thresholding the digitized test image 325 using the determined threshold T as illustrated in FIG. 23. In this example, pixels values less than the threshold are set to "1" and pixels values greater than or equal to the threshold are set to "0." A hole filling operation can be performed to fill in any extraneous black spots in the binary image 433. Similarly, another operation can be used to eliminate any extraneous white features which may be found in the binary image 433. The result should be 3 columns of 11 blobs, where the first column corresponds to the first alignment patterns 420 and the third column corresponds to the second alignment patterns 421. The areas and centroids of each of the blobs are then determined. A rotation correction can optionally be performed by comparing the coordinates of the top and bottom left blobs (and/or the top and bottom right blobs) and rotating the determined blob centroids and the digitized test image 325.

For a particular digitized test pattern 326, a determine analysis zone position step 374 is then used to determine an analysis zone position 376 based on the determined positions of the alignment patterns 372. The analysis zone position 376 is preferably a rectangular region contained within the uniform density region 405 of the digitized test pattern 326 which includes the slot 410. For example, the cross-track position of the analysis zone can be determined relative to the midpoint of the cross-track positions of the alignment patterns 420, 421, and the in-track position of the analysis zone can be determined relative to the in-track position of the first alignment pattern 420 (because the uniform density region 405 is printed with the same jetting module 30A as the first alignment pattern 420). The height and width of the analysis zone can be predefined, or can be determined based on the height and width of the blobs. For example, the height of the analysis zone can be a predefined percentage of the height of the blob corresponding to the first alignment pattern 420, and the width of the analysis zone can be determined relative to the width of the central blob corresponding to the uniform density region 405. One skilled in the art will recognize that many variations are possible in the process of determining the analysis zone position 376.

Figure 24:
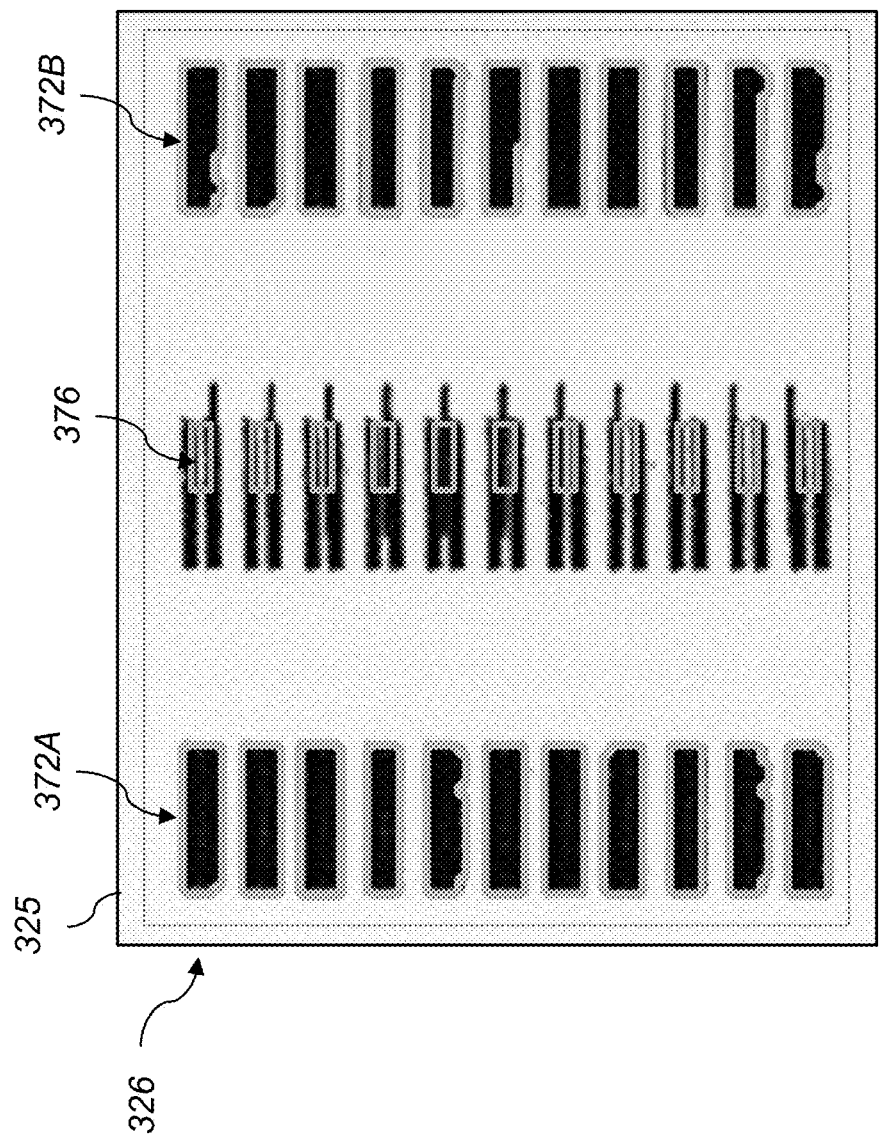
FIG. 24 illustrates the analysis zones determined for the digitized test image of FIG. 20.

FIG. 24 shows the digitized test image 325 of FIG. 20 overlaid with the determined positions of the left alignment pattern 372A and the right alignment pattern 372B, together with the determined analysis zone position 376 for each of the digitized test patterns 326. The image pixels within the analysis zones 376 can then be analyzed using a determine stitch score step 378 (FIG. 21) to determine a corresponding stitch score 380 representing a degree of alignment between the slot 410 in the first test pattern portion 400 and the bar 415 in the second test pattern portion 401 (FIG. 19). The stitch score 380 can be generated using either the pixel data in the binary image 433 or the pixel data in the digitized test image within the analysis zone 376. In an exemplary embodiment, the stitch score 380 is a statistical quantity representing a variability of the digitized test pattern 326 within the corresponding analysis zone. It can be seen that when the slot 410 of the uniform density region is well-aligned with the bar 415, the pixels within the analysis zone are approximately uniform, while when they are misaligned there is an increasingly larger amount of light image pixels. Well-aligned test patterns will therefore have a lower variability than misaligned test patterns. In a preferred configuration the statistical quantity computed to provide the stitch score 380 is the standard deviation of the pixels within the analysis zone. In alternate configurations, the statistical quantity can be any other appropriate statistical values known in the art. For example, other measures of the statistical variability can be used such as a variance or a range. Alternately, measures of the central tendency such as a mean or a medium of the pixels within the analysis zone can be used. Well-aligned test patterns will generally have a darker average density than misaligned test patterns. The minimum density can also be used as a statistical quantity where well-aligned test patterns will generally have a darker minimum density than misaligned test patterns.

Another offset value test 384 is used to determine whether all of the digitized test patterns 326 within the digitized test image 325 have been analyzed to determine a corresponding stitch score 380. If not, the analysis process is repeated for the digitized test pattern 326 corresponding to the next offset value.

Figure 25:
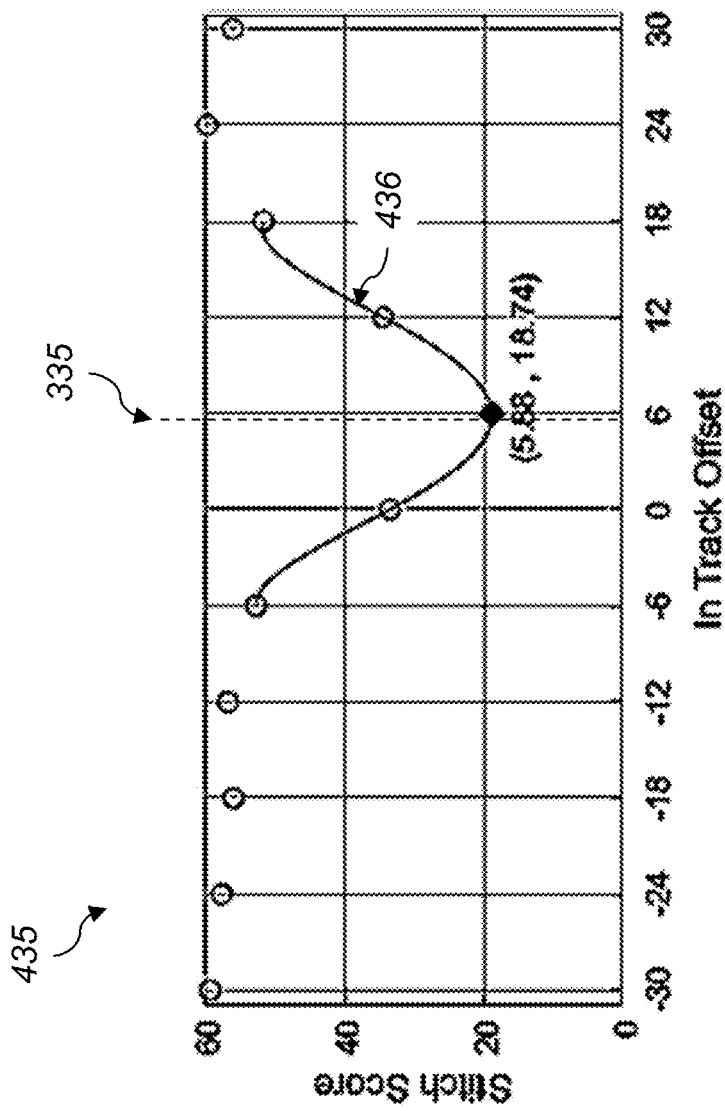
FIG. 25 is a graph of stitch score as a function of in-track offset which can be used to determine the aim offset value.

When all of the digitized test patterns 326 have been analyzed, a determine aim offset value step 386 is used to determine an aim offset value 335 based on the determined stitch scores 380. FIG. 25 shows a graph 435 of the determined stitch scores 380 as a function of the in-track offset for each of the digitized test patterns 326. It can be seen that the magnitude of the measured stitch score 380 is smallest for an in-track offsets of 6. In some embodiments, the in-track offset corresponding to the smallest measured stitch score 380 can be used as the aim offset value 335. In a preferred embodiment, a mathematical function (e.g., a polynomial function) is fit to the stitch scores surrounding the minimum stitch score (e.g., to the stitch scores corresponding to five in-track offsets centered on the minimum stitch score) to provide a stitch score function 436. The determined stitch score function 436 can then be evaluated to determine the aim offset value 335 corresponding to the in-track offset that minimizes the stitch score function 436. In the illustrated example, the aim offset value 335 corresponds to an in-track offset of 5.88.

Figure 26:
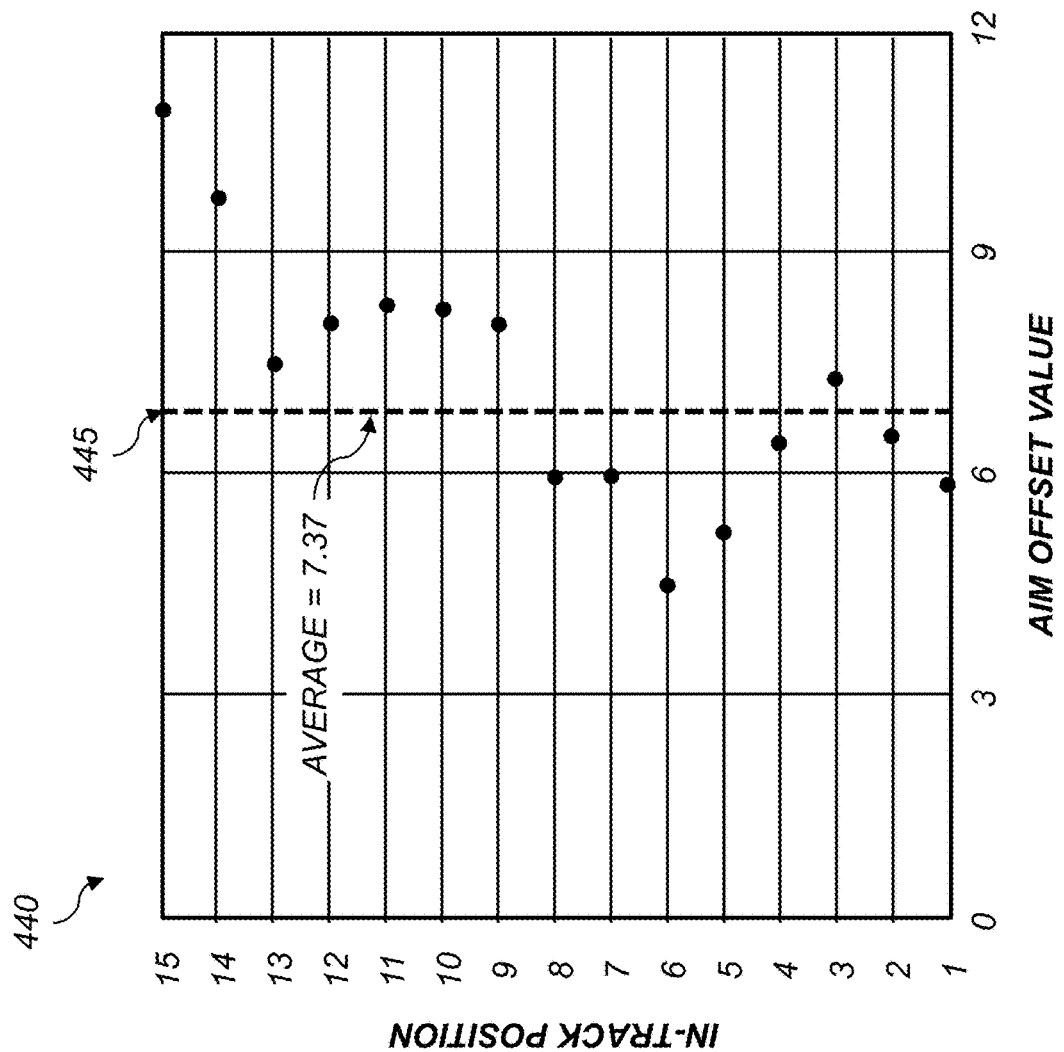
FIG. 26 is a graph showing aim offset values determined for a set of different in-track positions.

In some embodiments a plurality of test images 300 (FIG. 18) are printed at different positions within the page (e.g., at 15 different in-track positions). In this case, an aim offset value 335 can be determined for each of the test images 300. In some embodiments, the determine individual aim offset values 335 can be averaged to determine an overall aim offset value 335. In other embodiments, the determined stitch scores 380 at each in-track offset can be averaged to determine an average stitch score for each in-track offset, and a stitch score function 436 can be fit to the average stitch scores. The in-track offset that minimizes the resulting stitch score function 436 can then be used for the overall aim offset value 335. For example, FIG. 26 shows a graph 440 showing a set of aim offset values 335 determined at a set of different in-track positions within the printed image. In this case, the determined aim offset values 335 can be averaged to determine an overall aim offset value 445, which in this case is equal to 7.37.

Returning to a discussion of FIG. 18, once the aim offset value 335 for each pair of adjacent jetting modules 30A, 30B is determined, a determine offset correction values step 340 is used to determine a set of offset correction values 345 that can be used to print production image data 350. In an exemplary embodiment, the offset correction values 345 are time delays that are applied for each jetting module 30. Given the staggered positions of the jetting modules 30 in each printing module 12 (FIG. 2), a time delay is required to align the jetting modules in the staggered positions. Nominal time delays can be used to print the test images 300 (FIG. 19). In an exemplary embodiment for a printing module that includes five jetting modules, the following nominal time delays can be used:

| A | B | C | D | E |
|---|---|---|---|---|
| 3600 | 12150 | 3600 | 12150 | 3600 |

The time delays for jetting modules B and C differ from the time delays for jetting modules A, C and E by 8550 tach counts, corresponding to a nominal offset between the staggered jetting modules of about 60 mm.

The above described method can then be used to determine aim offset values 335 for each pair of adjacent jetting modules. In one example, the following aim offset values 335 were determined:

| A/B | B/C | C/D | D/E |
|---|---|---|---|
| 7 | 1 | −2 | 4 |

These values represent the relative offsets that must be applied to the time delays between each pair of adjacent jetting modules. The relative offsets can be accumulated across the printing modules to determine accumulated offsets. For example, an offset of 7 is applied to jetting module B, an accumulated offset of 7+1=8 is applied for jetting module C, an accumulated offset of 7+1−2=6 is applied for jetting module D, and an accumulated offset of 7+1−2+4=10 is applied for jetting module E. Adding these offsets to the nominal time delays above gives the following corrected time delays:

| A | B | C | D | E |
|---|---|---|---|---|
| 3600 | 12157 | 3608 | 12156 | 3610 |

In some embodiments, a table of the corrected time delays is stored as the offset correction values 345. In other embodiments, a table of the aim offset values or the accumulated offset values can be stored as the offset correction values 345 and can be used to modify the nominal time delays at the time that the production image data 350 is printed.

A print image data 355 is used to print production image data 350 using the offset correction values 345 to produce a printed image 360 which has reduced in-track stitch errors at the boundaries between the jetting modules 30. This can be combined with the method described earlier to correct for both the cross-track and in-track stitch errors.

Another type of alignment error that can occur in a multi-color printing 10 (FIG. 1) is color-to-color alignment errors. Such errors can occur in both the in-track and cross-track directions. In some embodiments, the offset correction values 345 for one printing module 12 can be modified by adding an additional time delay to account for the color-to-color in track alignment errors relative to a reference printing module 12. In an exemplary embodiment, color-to-color alignment errors can be corrected using any appropriate method known in the art such as those disclosed in commonly-assigned U.S. Pat. Nos. 8,842,330 and 8,842,331.

In a preferred embodiment, the printing system 10 (FIG. 1) includes a data processing system that is used to perform the method of the present invention. The method can be performed using a computer program product stored on a memory system. The memory system can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more data processing systems to practice the method according to the present invention.

The invention has been described in detail with particular reference to certain preferred embodiments thereof, but it will be understood that variations and modifications can be effected within the spirit and scope of the invention.

PARTS LIST 10 printing system
12 printing module
14 receiver medium
16 in-track direction
17 cross-track direction
18 dryer
20 imaging system
22 imaging device
30 jetting module
30A jetting module
30B jetting module
31 nozzle array
32 printing region
34 overlap region
36 centerline
37 print jets
38 stitch jets
39 guard jets
40 printing jets
42 masking jets
100 test image print data
105 test pattern
110 print test image step
115 printed test image
116 printed test pattern
116A printed test pattern
116B printed test pattern
116C printed test pattern
116D printed test pattern
116E printed test pattern
116F printed test pattern
120 digitize printed test image step
125 digitized test image 126 digitized test pattern
127C center third
127L left third
127R right third
130 analyze digitized test image step
135 aim stitch gap
140 determine stitching error correction values step
145 stitching error correction values
150 production image data
155 print image data step
160 printed image
165 in-track position
170 detect cross-track positions of reference features step
172 determine cross-track stitching boundary position step
174 determine stitching boundary density step
176 determine uniform region density step
178 determine stitch score step
180 in-track position test
182 determine average stitch score step
184 stitch gap test
186 determine aim stitch gap step
190A cross-track reference mark position
190B cross-track reference mark position
192 cross-track stitching boundary position
194 uniform density region
196 buffer zone
200 stitching boundary
205A test pattern portion
205B test pattern portion
210A uniform density region
210B uniform density region
212A region boundary
212B region boundary
214A feature spacing
214B feature spacing
215A reference feature
215B reference feature
220 graph
222 line
224 zero crossing
230 graph
232C stitch gap function
232K stitch gap function
232M stitch gap function
232Y stitch gap function
233 graph
234C fill function
234K fill function
234M fill function
234Y fill function
240 table
242 table
244 table
246 mask tables
300 test image
305 test pattern
310 print test image step
315 printed test image
316 printed test pattern
320 digitize printed test image step
325 digitized test image
326 digitized test pattern
330 analyze digitized test image step
335 aim offset value
340 determine offset correction values step
345 offset correction values
350 production image data
355 print image data step
360 printed image
370 detect positions of alignment patterns step
372 positions of alignment patterns
372A left alignment pattern
372B right alignment pattern
374 determine analysis zone position step
376 analysis zone position
378 determine stitch score step
380 stitch scores
384 another offset value test
386 determine aim offset value step
400 first test pattern portion
401 first test pattern portion
405 uniform density region
410 slot
415 bar
420 first alignment pattern
421 second alignment pattern
425 overlapping portion
430 histogram
431 peak
432 peak
433 binary image
435 graph
436 stitch score function
440 graph
445 overall aim offset value

The invention claimed is:

1. A method of reducing in-track stitch errors in an inkjet printer including a plurality of jetting modules that are staggered in an in-track direction such that adjacent jetting modules partially overlap in an overlap region, each of the plurality of jetting modules including a plurality of jets wherein some of the jets of adjacent jetting modules are overlapping jets that overlap in the overlap region, comprising:

a) applying test image print data to the linehead to produce a printed test image on a print media using the jets of adjacent jetting modules including the overlapping jets, wherein the test image print data includes:
  a test pattern for each of a plurality of in-track offset values, including:
    i) a first test pattern portion to be printed with a first of the adjacent jetting modules including a uniform density region having a slot with a slot width, the slot extending in a cross-track direction; and
    ii) a second test pattern portion to be printed with a second of the adjacent jetting modules including a bar having a bar width, the bar extending in the cross-track direction;
  wherein the bar width is substantially equal to the slot width;
  wherein the uniform density region of the first test pattern portion and the bar of the second test pattern portion overlap in the cross-track direction and are printed with jets in the overlap region; and
  wherein a nominal in-track position of the bar in each test pattern is offset from a nominal in-track position of the slot by the in-track offset value;

b) digitizing the printed test pattern to determine digitized test pattern data;

c) analyzing the digitized test pattern data for each in-track offset value in an analysis zone within the overlap region to determine a stitch score for each of the in-track offset values, wherein the stitch score represents a degree of alignment between the slot in the first test pattern portion and the bar in the second test pattern portion;

d) analyzing the determined stitch scores to determine an aim offset value where the slot in the first test pattern portion is aligned with the bar in the second test pattern portion; and e) determining an offset correction value responsive to the determined aim offset value, wherein the offset correction value is adapted to be applied to production image data subsequently printed using the adjacent jetting modules of the linehead to reduce in-track stitch errors.

2. The method of claim 1, wherein the stitch score is a statistical quantity representing a variability of the digitized test pattern data in the analysis zone.

3. The method of claim 2, wherein the statistical quantity is a variance, a standard deviation or a range.

4. The method of claim 1, wherein the stitch score is a mean, a median or a minimum of the digitized test pattern data in the analysis zone.

5. The method of claim 1, wherein the test pattern for each of the in-track offset values further includes:

a first alignment pattern portion to be printed with the first of the adjacent jetting modules, the first alignment pattern portion having a defined position relative to the uniform density region; and a second alignment pattern portion to be printed with the second of the adjacent jetting modules, the second alignment pattern portion having a defined position relative to the bar.

6. The method of claim 5, wherein the first and second alignment pattern portions are uniform density regions having a defined shape.

7. The method of claim 5, wherein step c) includes:

analyzing the digitized test pattern data to determine a position of the first alignment pattern portion for each test pattern;

analyzing the digitized test pattern data to determine a position of the second alignment pattern portion for each test pattern;

determining a position of the analysis zone in the digitized test pattern data for each test pattern responsive to the determined positions of the first and second alignment pattern portions, the analysis zone including an area where the uniform density region of the printed first test pattern portion overlaps with the bar of the printed second test pattern portion.

8. The method of claim 7, wherein the positions of the first and second alignment pattern portions are determined by computing a centroid of the first and second alignment pattern portions in the digitized test pattern data.

9. The method of claim 7, wherein the position of the analysis zone is determined relative to a midpoint between the determined positions of the first and second alignment pattern portions.

10. The method of claim 1, wherein step d) includes:

fitting a stitch score function to the determined stitch scores as a function of the in-track offset value; and determining the aim offset value by determining the in-track offset value that minimizes the stitch score function.

11. The method of claim 1, wherein step d) includes determining the aim offset value by selecting the in-track offset value corresponding to the smallest determined stitch score.

12. The method of claim 1, wherein the offset correction value is used to determine a printing timing delay for at least one of the adjacent jetting modules.

13. The method of claim 1, wherein a plurality of printed test images are printed using the test image print data, and wherein the aim offset value is determined responsive to average stitch scores determined by averaging stitch scores determined from each of the printed test images.

14. The method of claim 1, further including using steps a)-e) to determine offset correction values for each pair of adjacent jetting modules.

15. The method of claim 14, wherein the offset correction values are calculated are accumulated across the linehead in order to reduce the in-track stitch errors across the linehead.

16. The method of claim 14, wherein the offset correction values are chosen to best align the jetting modules of one line head with the jetting modules in a reference line head.

* * * * *